United States Patent
McMillan

(10) Patent No.: US 11,863,821 B2
(45) Date of Patent: *Jan. 2, 2024

(54) MEDIA MONITORING USING MULTIPLE TYPES OF SIGNATURES

(71) Applicant: The Nielsen Company (US), LLC, New York, NY (US)

(72) Inventor: Francis Gavin McMillan, Tarpon Springs, FL (US)

(73) Assignee: The Nielsen Company (US), LLC, New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/145,711

(22) Filed: Dec. 22, 2022

(65) Prior Publication Data
US 2023/0126218 A1     Apr. 27, 2023

Related U.S. Application Data

(63) Continuation of application No. 17/353,391, filed on Jun. 21, 2021, which is a continuation of application
(Continued)

(51) Int. Cl.
*H04N 21/442*     (2011.01)
*G06F 16/48*     (2019.01)
(Continued)

(52) U.S. Cl.
CPC ..... *H04N 21/44204* (2013.01); *G06F 16/152* (2019.01); *G06F 16/48* (2019.01);
(Continued)

(58) Field of Classification Search
CPC ....... G06F 16/152; G06F 16/48; H04H 20/14; H04H 2201/90; H04H 60/56; H04N 21/44008; H04N 21/44204; H04N 21/84
See application file for complete search history.

(56) References Cited

U.S. PATENT DOCUMENTS

| 4,677,466 A | 6/1987 | Lert, Jr. et al. |
| 5,481,294 A | 1/1996 | Thomas et al. |
| | (Continued) | |

FOREIGN PATENT DOCUMENTS

| CA | 2293957 | 7/2000 |
| EP | 2315378 | 4/2011 |
| | (Continued) | |

OTHER PUBLICATIONS

European Patent Office, "Communication Pursuant to Article 94(3) EPC," mailed in connection with European Patent Application No. 13001543.1, dated Jun. 19, 2018, 6 pages.
(Continued)

*Primary Examiner* — Bobbak Safaipour

(57) ABSTRACT

Example local devices disclosed herein include memory including a set of reference fingerprints corresponding to media, the set of reference fingerprints from a remote device different from the local device and one or more processor circuits to execute machine readable instructions to generate a monitored fingerprint of the media presented at a location and compare the monitored fingerprint to at least some of the set of reference fingerprints from the remote device. Additionally, the one or more processor circuits are to determine an amount of time that has passed since the media started and after a match between the monitored fingerprint and one or more reference fingerprints of the set of reference fingerprints, cause transmission of audience measurement information to identify the media, the audience measurement information including data indicative of the amount of time that has passed since the media started.

20 Claims, 10 Drawing Sheets

Related U.S. Application Data

No. 16/235,953, filed on Dec. 28, 2018, now Pat. No. 11,044,523, which is a continuation of application No. 15/594,175, filed on May 12, 2017, now Pat. No. 10,212,477, which is a continuation of application No. 14/800,317, filed on Jul. 15, 2015, now Pat. No. 9,674,574, which is a continuation of application No. 14/299,794, filed on Jun. 9, 2014, now Pat. No. 9,106,952, which is a continuation of application No. 13/430,342, filed on Mar. 26, 2012, now Pat. No. 8,768,003.

(51) Int. Cl.
  *G06F 16/14* (2019.01)
  *H04H 20/14* (2008.01)
  *H04H 60/56* (2008.01)
  *H04N 21/44* (2011.01)
  *H04N 21/84* (2011.01)

(52) U.S. Cl.
  CPC ............ *H04H 20/14* (2013.01); *H04H 60/56* (2013.01); *H04N 21/44008* (2013.01); *H04N 21/84* (2013.01); *H04H 2201/90* (2013.01)

(56) References Cited

U.S. PATENT DOCUMENTS

| | | | |
|---|---|---|---|
| 5,574,963 A | 11/1996 | Weinblatt et al. | |
| 5,594,934 A | 1/1997 | Lu et al. | |
| 6,272,176 B1 | 8/2001 | Srinivasan | |
| 6,453,252 B1 | 9/2002 | Laroche | |
| 6,469,749 B1 | 10/2002 | Dimitrova et al. | |
| 6,513,717 B2 | 2/2003 | Hannigan | |
| 6,990,453 B2 | 1/2006 | Wang et al. | |
| 7,006,176 B2 | 2/2006 | Fujibayashi et al. | |
| 7,072,487 B2 | 7/2006 | Reed et al. | |
| 7,284,255 B1 | 10/2007 | Apel et al. | |
| 7,289,643 B2 | 10/2007 | Brunk et al. | |
| 7,460,684 B2 | 12/2008 | Srinivasan | |
| 7,590,259 B2 | 9/2009 | Levy et al. | |
| 7,623,823 B2 | 11/2009 | Zito et al. | |
| 7,630,888 B2 | 12/2009 | Bichsel | |
| 7,672,843 B2 | 3/2010 | Srinivasan et al. | |
| 7,783,889 B2 | 8/2010 | Srinivasan | |
| 7,793,318 B2 | 9/2010 | Deng | |
| 8,768,003 B2* | 7/2014 | McMillan ............ G06F 16/152 | |
| | | | 714/732 |
| 9,106,952 B2* | 8/2015 | McMillan ............ H04H 20/14 | |
| 9,674,574 B2* | 6/2017 | McMillan ............ H04N 21/84 | |
| 10,212,477 B2* | 2/2019 | McMillan ............ G06F 16/152 | |
| 11,044,523 B2* | 6/2021 | McMillan ............ H04N 21/84 | |
| 11,363,332 B1* | 6/2022 | Petro ................ H04N 21/4394 | |
| 11,412,296 B2* | 8/2022 | Seo ...................... H04H 60/59 | |
| 2002/0083060 A1 | 6/2002 | Wang et al. | |
| 2002/0133499 A1 | 9/2002 | Ward et al. | |
| 2003/0061369 A1 | 3/2003 | Aksu et al. | |
| 2005/0039064 A1 | 2/2005 | Balakrishnan et al. | |
| 2005/0232411 A1 | 10/2005 | Srinivasan et al. | |
| 2006/0153296 A1 | 7/2006 | Deng | |
| 2006/0184961 A1 | 8/2006 | Lee et al. | |
| 2006/0195861 A1 | 8/2006 | Lee | |
| 2006/0277047 A1 | 12/2006 | DeBusk et al. | |
| 2007/0274537 A1 | 11/2007 | Srinivasan | |
| 2008/0086304 A1 | 4/2008 | Neuhauser | |
| 2008/0091288 A1 | 4/2008 | Srinivasan | |
| 2008/0276265 A1 | 11/2008 | Topchy et al. | |
| 2009/0013414 A1 | 1/2009 | Washington et al. | |
| 2010/0153982 A1* | 6/2010 | Ramaswamy ....... H04N 21/835 | |
| | | | 725/19 |
| 2010/0262642 A1 | 10/2010 | Srinivasan | |
| 2011/0088053 A1 | 4/2011 | Lee | |
| 2011/0106587 A1 | 5/2011 | Lynch et al. | |
| 2012/0056785 A1 | 3/2012 | Jovicic et al. | |
| 2013/0251189 A1 | 9/2013 | McMillan | |
| 2014/0289755 A1 | 9/2014 | McMillan | |
| 2015/0325003 A1* | 11/2015 | Cleveland ............... G06T 7/246 | |
| | | | 382/103 |
| 2015/0371440 A1* | 12/2015 | Pirchheim ................ G06T 7/73 | |
| | | | 345/419 |
| 2017/0251252 A1* | 8/2017 | McMillan ............. G06F 16/152 | |
| 2019/0141391 A1 | 5/2019 | McMillan | |
| 2020/0372672 A1* | 11/2020 | Schonberger ............. G06T 7/74 | |
| 2021/0314660 A1* | 10/2021 | McMillan ............... G06F 16/48 | |

FOREIGN PATENT DOCUMENTS

| | | |
|---|---|---|
| JP | 2003264683 | 9/2003 |
| JP | 2003528538 | 9/2003 |
| JP | 2004080103 | 3/2006 |
| JP | 2006139693 | 6/2006 |
| JP | 2009532156 | 9/2009 |
| WO | 9512278 | 5/1995 |
| WO | 0171960 | 9/2001 |
| WO | 0251063 A | 6/2002 |
| WO | 2010049809 | 9/2003 |
| WO | 2004030350 | 4/2004 |
| WO | 2007113484 | 10/2007 |

OTHER PUBLICATIONS

European Patent Office, "Examination Report," mailed in connection with European Patent Application No. 13001543.1, dated Jun. 9, 2017, 6 pages.

European Patent Office, "Extended European Search Report," mailed in connection with European Patent Application No. 13001543.1, dated Sep. 16, 2013, 8 pages.

Japanese Intellectual Property Office, "Notice of Reasons for Rejection," mailed in connection with Japanese Patent Application No. P2013-064402, dated Feb. 18, 2014, 6 pages.

United States Patent and Trademark Office, "Non-final Office Action," mailed in connection with U.S. Appl. No. 13/430,342, dated Oct. 17, 2013, 7 pages.

United States Patent and Trademark Office, "Notice of Allowance," mailed in connection with U.S. Appl. No. 13/430,342, dated Feb. 12, 2014, 9 pages.

IP Australia, "Examination Report," mailed in connection with Australian Patent Application No. 2013201983, dated Jun. 3, 2014, 3 pages.

Canadian Intellectual Property Office, "Office Action," mailed in connection with Canadian Patent Application No. 2,810,961, dated Aug. 13, 2014, 2 pages.

IP Australia, "Examination Report," mailed in connection with Australian Patent Application No. 2013203410, dated Sep. 9, 2014, 3 pages.

Japanese Intellectual Property Office, "Notice of Allowance," mailed in connection with Japanese Patent Application No. 2013-064402, dated Oct. 14, 2014, 3 pages.

IP Australia, "Notice of Acceptance," mailed in connection with Australian Patent Application No. 2013201983, dated Jun. 26, 2015, 2 pages.

United States Patent and Trademark Office, "Non-final Office Action," mailed in connection with U.S. Appl. No. 14/299,794, dated Nov. 14, 2014, 9 pages.

United States Patent and Trademark Office, "Notice of Allowance," mailed in connection with U.S. Appl. No. 14/299,794, dated Apr. 1, 2015, 10 pages.

IP Australia, "Examination Report," mailed in connection with Australian Patent Application No. 2013203410, dated Jun. 19, 2015, 3 pages.

IP Australia, "Notice of Acceptance," mailed in connection with Australian Patent Application No. 2013203410, dated Sep. 14, 2015, 2 pages.

Canadian Intellectual Property Office, "Notice of Allowance," mailed in connection with Canadian Patent Application No. 2,810,961, dated Sep. 17, 2015, 1 page.

(56) References Cited

OTHER PUBLICATIONS

State Intellectual Property Office of China, "First Notification of Office Action," mailed in connection with Chinese Patent Application No. 201310206837.7, dated Dec. 3, 2015, 23 pages.

European Patent Office, "Examination Report," mailed in connection with European Patent Application No. 13001543.1, dated Jan. 8, 2016, 6 pages.

State Intellectual Property Office of China, "Notice of Allowance," mailed in connection with Chinese Patent Application No. 201310206837.7, dated Aug. 1, 2016, 5 pages.

Japanese Patent Office, "Notice of Allowance," mailed in connection with Japanese Patent Application No. 2014-230101, dated Dec. 15, 2015, 3 pages.

United States Patent and Trademark Office, "Non-final Office Action," mailed in connection with U.S. Appl. No. 14/800,317, dated Sep. 28, 2016, 7 pages.

United States Patent and Trademark Office, "Notice of Allowance," mailed in connection with U.S. Appl. No. 14/800,317, dated Feb. 2, 2017, 10 pages.

United States Patent and Trademark Office, "Notice of Allowance," mailed in connection with U.S. Appl. No. 15/594,175, dated Oct. 30, 2018, 8 pages.

United States Patent and Trademark Office, "Non-final Office Action," mailed in connection with U.S. Appl. No. 15/594,175, dated Apr. 4, 2018, 8 pages.

European Patent Office, "Extended European Search Report," mailed in connection with European Patent Application No. 20168720.9, dated Aug. 3, 2020, 5 pages.

United States Patent and Trademark Office, "Notice of Allowance," mailed in connection with U.S. Appl. No. 16/235,953, dated Feb. 22, 2021, 9 pages.

United States Patent and Trademark Office, "Non-Final Office Action," dated Sep. 16, 2020, in connection with U.S. Appl. No. 16/235,953, 12 pages.

European Patent Office, "Communication under Rule 71(3) EPC," dated Dec. 12, 2022, in connection with European Application No. 20168720.9, 62 pages.

United States Patent and Trademark Office, "Non-Final Office Action," dated Oct. 5, 2022, in connection with U.S. Appl. No. 17/353,391, 12 pages.

United States Patent and Trademark Office, "Notice of Allowance and Fee(s) Due," dated Jan. 25, 2023, in connection with U.S. Appl. No. 17/353,391, 8 pages.

United States Patent and Trademark Office, "Non-Final Office Action," dated May 19, 2023, in connection with U.S. Appl. No. 17/353,391, 7 pages.

\* cited by examiner

MEDIA MONITORING USING MULTIPLE TYPES OF SIGNATURES

RELATED APPLICATION(S)

This patent arises from a continuation of U.S. patent application Ser. No. 17/353,391 (now U.S. Pat. No. 11,044,523), entitled "MEDIA MONITORING USING MULTIPLE TYPES OF SIGNATURES," which was filed on Jun. 21, 2021, and is a continuation of U.S. patent application Ser. No. 16/235,953 (now U.S. Pat. No. 11,044,523), entitled "MEDIA MONITORING USING MULTIPLE TYPES OF SIGNATURES," which was filed on Dec. 28, 2018, and is a continuation of U.S. patent application Ser. No. 15/594,175 (now U.S. Pat. No. 10,212,477), entitled "MEDIA MONITORING USING MULTIPLE TYPES OF SIGNATURES," which was filed on May 12, 2017, and is a continuation of U.S. patent application Ser. No. 14/800,317 (now U.S. Pat. No. 9,674,574), entitled "MEDIA MONITORING USING MULTIPLE TYPES OF SIGNATURES," which was filed on Jul. 15, 2015, and is a continuation of U.S. patent application Ser. No. 14/299,794 (now U.S. Pat. No. 9,106,952), entitled "MEDIA MONITORING USING MULTIPLE TYPES OF SIGNATURES," which was filed on Jun. 9, 2014, and is a continuation of U.S. patent application Ser. No. 13/430,342 (now U.S. Pat. No. 8,768,003), entitled "MEDIA MONITORING USING MULTIPLE TYPES OF SIGNATURES," which was filed on Mar. 26, 2012. Priority to U.S. patent application Ser. No. 13/430,342; U.S. patent application Ser. No. 14/299,794; U.S. patent application Ser. No. 14/800,317; U.S. patent application Ser. No. 15/594,175; U.S. patent application Ser. No. 16/235,953; and U.S. patent application Ser. No. 17/353,391 is hereby claimed. U.S. patent application Ser. No. 13/430,342; U.S. patent application Ser. No. 14/299,794; U.S. patent application Ser. No. 14/800,317; U.S. patent application Ser. No. 15/594,175; U.S. patent application Ser. No. 16/235,953; and U.S. patent application Ser. No. 17/353,391 are hereby incorporated by reference in their respective entireties.

FIELD OF THE DISCLOSURE

This disclosure relates generally to media monitoring and, more particularly, to media monitoring using multiple types of signatures.

BACKGROUND

An audience measurement system typically includes one or more device meters to monitor the media presented by one or more media devices located at one or more monitored sites. Such a device meter can use watermarks decoded from the presented media or signatures (also referred to as media fingerprints) generated from the presented media, or both, to monitor (e.g., identify and track) the media being presented by a media device. When signatures are used for media monitoring, signatures of the monitored media (referred to herein as collected signatures or monitored signatures) are generated by the device meter and compared to reference signatures representative of reference media known to the audience measurement system. For media monitoring applications in which the amount of reference media for comparison is large, correspondingly large signatures (e.g., having high resolution) are usually needed to accurately identify the monitored media within a reasonable time period.

DETAILED DESCRIPTION

Figure 1:
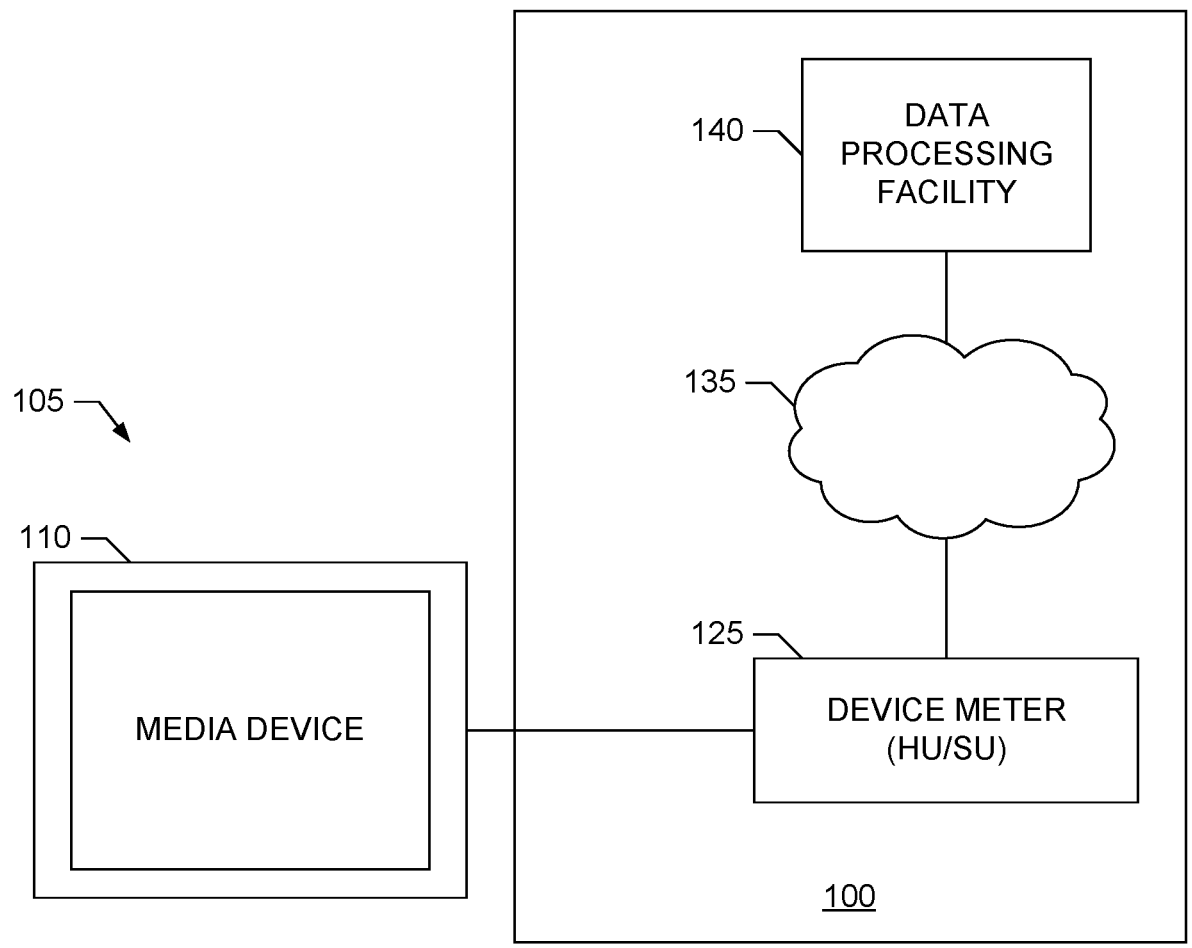
FIG. 1 is a block diagram of an example audience measurement system that supports media monitoring using multiple types of signatures as disclosed herein.

Media monitoring using multiple types of signatures is disclosed herein. As noted above, an audience measurement system can use media signatures to identify/monitor media being presented by a media device. In such an audience measurement system, monitored signatures are generated from the monitored media and compared with reference signatures representative of reference media known to the audience measurement system. As also noted above, large signatures, which correspond to high resolution signatures, also referred to herein as rich signatures, may be needed to accurately and quickly identify the monitored media when the amount of reference media for comparison is large. However, it may be impractical (e.g., in terms of cost, memory, bandwidth, etc.) to use such large signatures to perform continuous monitoring of the media presented by a monitored media device. Thus, prior media identification techniques that employ large, rich signatures to quickly perform a single identification of a particular media presentation may not be applicable to media monitoring applications involving continuous media device monitoring.

In contrast, media monitoring in accordance with the examples disclosed herein uses multiple types of signatures for media monitoring to overcome the impracticalities of prior, single-type signature-based systems, at least in some examples. For example, a first type of signature (e.g., a larger, rich signature) can be used by example disclosed audience measurement systems to initially identify (e.g., quickly) a monitored media presentation from among a potentially large amount of reference media. Then, after the monitored media has been initially identified, a second type of signature (e.g., a smaller, lower resolution signature) can be used by the audience measurement systems for continuous monitoring of the media presentation, at least until the media changes. In some examples, the first type of signature (e.g., the larger, high resolution signature) and the second type of signature (e.g., the smaller, low resolution signature) can be derived from the same signature algorithm, whereas in other examples, the first and second types of signatures are derived from different signature algorithms. In the event that the media being presented by monitored media device changes, example disclosed audience measurement systems can revert to using the first type of signature (e.g., the larger, rich signature) to initially identify (e.g., quickly) this new media presentation, followed again by using the second type of signature (e.g., the smaller, lower resolution signature) to perform continuous monitoring.

Accordingly, example media monitoring methods disclosed herein include processing monitored signatures (also referred to as collected signatures) of a first type to monitor media presented by a media device until a first one of the monitored signatures of the first type is determined to match a reference signature of the first type. The reference signature of the first type is associated with first reference media (e.g., from among a group of reference media that may include the monitored media being presented by the media device). The example methods also include using monitored signatures of a second type to monitor the media presented by the media device after the first one of the monitored signatures of the first type is determined to match the reference signature of the first type and until a number of monitored signatures of the second type is determined not to match corresponding reference signatures of the second type. The reference signatures of the second type are also associated with the first reference media (e.g., which is the same reference media associated with the matching reference signature of the first type).

In some examples, the methods further include reverting to using the monitored signatures of the first type to monitor the media presented by the media presentation device when the number of monitored signatures of the second type is determined not to match the corresponding reference signatures of the second type. As noted above and described in greater detail below, in some examples, the signatures of the first type have a higher resolution (e.g., and, thus, are larger) than the signatures of the second type. Additionally or alternatively, in some examples, the methods adjust an interval between the monitored signatures of the second type based on one or more characteristics of the media presented by the media device.

Further example media monitoring methods, example apparatus to implement media monitoring using multiple types of signatures, and example articles of manufacture (e.g., storage media) storing machine readable instructions which, when executed, cause example machine(s) to perform media monitoring using multiple types of signatures, are also disclosed herein.

Turning to the figures, a block diagram of an example audience metering system 100 employing media monitoring using multiple types of signatures as disclosed herein is illustrated in FIG. 1. The example audience measurement system 100 supports monitoring of media exposure to audiences at one or more monitored sites, such as the example monitored site 105 illustrated in FIG. 1. The monitored site 105 includes an example media device 110, which is also referred to herein as a media presentation device 110. Although the example of FIG. 1 illustrates one monitored site 105 and one media device 110, media monitoring using multiple types of signatures as disclosed herein can be used in audience measurement systems 100 supporting any number of monitored sites 105 having any number of media devices 110.

The audience measurement system 100 of the illustrated example includes an example device meter 125, also referred to as a site meter 125, a site unit 125, a home unit 125, etc., to monitor media presented by the media device 110. In the illustrated example, the device meter 125 determines metering data that may identify and/or be used to identify media exposure at the monitored site 105. The audience measurement meter 125 then stores and reports this metering data via an example network 135 to an example data processing facility 140. The data processing facility 140 performs any appropriate post-processing of the audience measurement data to, for example, determine audience ratings information, identify targeted advertising to be provided to the monitored site 105, etc. In the illustrated example, the network 130 can correspond to any type(s) and/or number of wired and/or wireless data networks, or any combination thereof.

In the illustrated example, the media device 110 monitored by the device meter 125 can correspond to any type of audio, video and/or multimedia presentation device capable of presenting media audibly and/or visually. For example, the media device 110 can correspond to a television and/or display device that supports the National Television Standards Committee (NTSC) standard, the Phase Alternating Line (PAL) standard, the Système Électronique pour Couleur avec Mémoire (SECAM) standard, a standard developed by the Advanced Television Systems Committee (ATSC), such as high definition television (HDTV), a standard developed by the Digital Video Broadcasting (DVB) Project, etc. As another example, the media device 110 can correspond to a multimedia computer system, a personal digital assistant, a cellular/mobile smartphone, a radio, a tablet, etc.

In the audience measurement system 100 of the illustrated example, the device meter 125 and the data processing facility 140 cooperate to perform media monitoring using multiple types of signatures as disclosed herein. Unlike media monitoring techniques based on codes and/or watermarks included with and/or embedded in the monitored media, signature-based media monitoring techniques generally use one or more inherent characteristics of the monitored media during a monitoring time interval to generate a substantially unique proxy for the media. Such a proxy is referred to as a signature or signature, and can take the form of a series of digital values, a waveform, etc., representative of the media signal(s), such as the audio and/or video signals, forming the media presentation being monitored. A good signature is usually one that is repeatable when processing the same media presentation, but that is unique when processing other presentations of other media.

Signature-based media monitoring generally involves determining (e.g., generating) monitored signature(s) (also referred to as collected signature(s)) representative of a media signal (e.g., an audio signal and/or a video signal) output by a monitored media device and comparing the monitored signature(s) to one or more references signatures corresponding to known (e.g., reference) media sources. Various comparison criteria, such as a cross-correlation value, a Hamming distance, etc., can be evaluated to determine whether a monitored signature matches a particular reference signature. When a substantial match between the monitored signature and one of the reference signatures is found, the monitored media can be identified as corresponding to the particular reference media source represented by the reference signature that substantially matched the monitored signature. Because attributes, such as an identifier of the media, a presentation time, a broadcast channel, etc., are collected for the reference signature, these attributes may then be associated with the monitored media whose monitored signature matched the reference signature.

For example, in the audience measurement system 100 of FIG. 1, the device meter 125 may utilize invasive monitoring involving one or more physical connections to the media device 110, and/or non-invasive monitoring not involving any physical connection to the media device 110, to obtain access to one or more media signals corresponding to the media being presented by the media device 110. In some examples, the device meter 125 may process audio signals obtained from the media device 110 via a microphone and/or a direct cable connection to generate monitored audio signatures representative of the media being presented by the media device 110. Additionally or alternatively, the device meter 125 may process video signals obtained from the media device 110 via a camera and/or a direct cable connection to generate monitored video signatures (e.g., image signatures) representative of the media being presented by the media device 110. The device meter 125 and/or the data processing facility 140 then compare the monitored signatures generated by the device meter 125 with known reference signatures to identify/monitor the media being presented by the media device 110.

Furthermore, unlike prior signature-based media monitoring techniques, the device meter 125 and the data processing facility 140 of the example audience measurement system 100 employ multiple types of signatures to monitor the media being presented by the media device 110. For example, a first type of signature, such as a larger, higher resolution (e.g., rich) signature, can be used by the device meter 125 and the data processing facility 140 to initially identify the media being presented by the monitored media device 110. Then, after the monitored media is initially identified, a second type of signature, such as a smaller, lower resolution (e.g., light) signature, can be used by the device meter 125 and the data processing facility 140 to continue monitoring of the media being presented by the monitored media device 110. Use of such a lower resolution signature is advantageous as it lowers the processing and/or bandwidth requirements for the device(s) generating the signatures, transmitting the signatures, receiving the signatures, and/or performing the signature matching, thereby supporting continuous media monitoring with negligible (e.g., little to no) loss in accuracy. Furthermore, in at least some examples, the audience measurement system 100 can support real time media rating applications because the audience measurement system 100 can quickly identify the monitored media using, for example, high resolution signatures, and then perform continuous, efficient real-time monitoring using, for example, lower resolution signatures, which may utilize less processing power for signature matching than is utilized when matching the high resolution signatures.

In some examples, the interval at which the device meter 125 samples the media signal(s) forming the monitoring media presentation to generate the monitored signatures is varied depending on the characteristic(s) of the media signal(s), as described in greater detail below. Also, in the event that the media being presented by the media device 110 later changes (e.g., such as when a commercial advertisement is presented during a program broadcast, or due to a channel change, selection of a different media source, accessing of different online/on-demand media, a volume change, etc., any of which could be detected by, for example, infrared/wireless commands from a remote control device that are intercepted by the device meter 125) or the second type of signature otherwise is no longer able to accurately identify/monitor the presented media, the device meter 125 and the data processing facility 140 can revert to using the first type of signature to identify the new media being presented by the monitored media device 110. This process of using the first and second types of signatures then repeats to enable the new media being presented by the monitored media device 110 to be identified/monitored in an efficient and consistent manner. In some example, further types of signatures can be employed the device meter 125 and/or the data processing facility 140 for media monitoring to provide further granularity for switching among using signatures having different sizes, resolution characteristics, etc.

In some examples, to initially identify the media being presented by the media device 110 using a first type of signature (e.g., a high resolution signature), the device meter 125 samples and processes media signal(s) (e.g., an audio signal and/or a video signal) forming the monitored media presentation to collect (e.g., generate) monitored signatures (e.g., monitored audio signatures and/or monitored video signatures) of the first type (e.g., high resolution or otherwise rich signatures) that are representative of the media presentation. The device meter 125 then reports the monitored signatures of the first type, via the network 135, to the data processing facility 140. The data processing facility 140, in turn, receives the monitored signatures of the first type from the device meter 125 and compares the monitored signatures to a collection of reference signatures of the first type. In the illustrated example, the collection of reference signatures is representative of a collection of reference media that is known to the data processing facility 140. When at least one of the monitored signatures of the first type is determined to match (e.g., substantially match within a tolerance, threshold, etc.) a reference signature of the first type, the data processing facility 140 associates the media monitored at the monitored site 105 with the particular reference media corresponding to the matching reference signature. The data processing facility 140 also sends a success indication to the device meter 125 to indicate that a match between the reported monitored signatures and the reference signatures of the first type has been found.

After the media being presented by the media device 110 is identified using the signatures of the first type (e.g., as indicated by the success indication sent by the data processing facility 140 and received by the device meter 125), the device meter 125 switches to collecting (e.g., generating) monitored signatures (e.g., monitored audio signatures and/or monitored video signatures) of a second type (e.g., low resolution or otherwise light signatures) that are also representative of the media presentation. These monitored signatures of the second type are then compared to a sequence of reference signatures of the second type that are associated with the particular reference media corresponding to the matching signatures of the first type. In some examples, the monitored and reference signatures of the second type are representative of media segments sampled sequentially from the respective monitored and reference media. Also, in some of examples, the sequence of reference signatures of the second type is selected to have a starting reference signature that is representative of a reference media segment corresponding to a time or anchor point in the reference media that also corresponds to the reference signature of the first type that was determined to match the monitored signatures of the first type previously reported by the device meter 125. In other words, the anchor point in the reference media that corresponds to the reference media segment represented by the matching reference signature of the first type also defines the start of the sequence of reference signatures of the second type that are to be used for subsequent (e.g., continuous) monitoring of the media being presented by the media device 110.

In some examples, the device meter 125 reports the monitored signatures of the second type to the data processing facility 140 for comparison with the sequence of reference signatures of the second type. In such examples, generation, reporting and comparison of the signatures of the second type continues until the data processing facility 140 determines that a number of monitored signature(s) of the second type have failed to match the corresponding reference signature (s) in the sequence of reference signatures of the second type. When such a match failure is detected, the data processing facility 140 sends a match failure indication to the device meter 125 to indicate that the monitored signature(s) of the second type are no longer adequately matching the sequence of reference signature of the second type. This match failure indication also indicates that the monitored media presentation at the site 105 no longer corresponds to the previously identified reference media, thereby causing the device meter 125 to revert to using the signatures of the first type to identify the new media being presented by the media device 110.

In some examples, such as when the network 135 provides a high-speed Internet connection or an otherwise high bandwidth connection from the data processing facility 140 to the device meter 125, at least some of the signature comparison processing can be performed at the device meter 125 instead of the data processing facility 140. Such a paradigm shift can reduce the processing load and associated costs at the data processing facility 140 in favor of spreading the processing to the device meter(s) 125, which can potentially reduce overall costs in the audience measurement system 100. For example, after the media being presented by the media device 110 is identified using the signatures of the first type (e.g., as indicated by the success indication sent by the data processing facility 140 and received by the device meter 125), the data processing facility 140 can further send, to the device meter 125, sequence(s) of reference signatures of the second type to be used in subsequent (e.g., continuous) monitoring of the media being presented by the media device 110. As noted above, the start of the sequence of reference signatures of the second type provided to the device meter 125 corresponds to an anchor point in the particular reference media that also corresponds to the reference signature of the first type that was determined to match the monitored signatures of the first type previously generated and reported by the device meter 125. In such examples, the device meter 125 generates the monitored signatures of the second type from the media presented by the media device 110, and compares the monitored signatures to the sequence of reference signatures received from the data processing facility 140. Such signature generation and comparison continues (with further reference signatures of the second type being provided by the data processing facility 140 as needed to continue the sequence) until the device meter 125 determines that a number of monitored signature(s) of the second type have failed to match the corresponding reference signature(s) in the sequence of reference signatures of the second type. When such a match failure is detected, the device meter 125 sends a match failure indication to the data processing facility 140 to indicate that the monitored signature(s) of the second type are no longer adequately matching the sequence of reference signature of the second type. The device meter 125 also reverts to using the signatures of the first type to identify the new media being presented by the media device 110.

In the preceding examples, the number of monitored signature(s) of the second type that result in declaration of a failure has a value, which is greater than or equal to one, that, for example, can be hardcoded, preconfigured during system initialization, specified during system operation as a configuration parameter, etc. In some examples, the number is set to a low value to enable fast detection of a match failure, whereas in other examples, the number is set to a high value to provide robustness (e.g., such as when the second type of signature is a light signature that is susceptible to ambient noise, volume changes, etc., at the monitored site 105).

In some examples, the device meter 125 samples the media signal(s) (e.g., an audio signal and/or a video signal) forming the monitored media presentation and sends the media signal samples to the data processing facility 140, which generates and processes the different types of monitored signatures, as described above. Additionally or alternatively, in some examples, the audience measurement system 100 combines media monitoring using multiple types of signatures, as disclosed herein, with other media identification techniques, such as media identification based on (a) watermarks/codes embedded or otherwise included with the monitored media, (b) tuning data and/or device operation data obtained by monitoring operation of the media device 110, etc.

Figure 2:
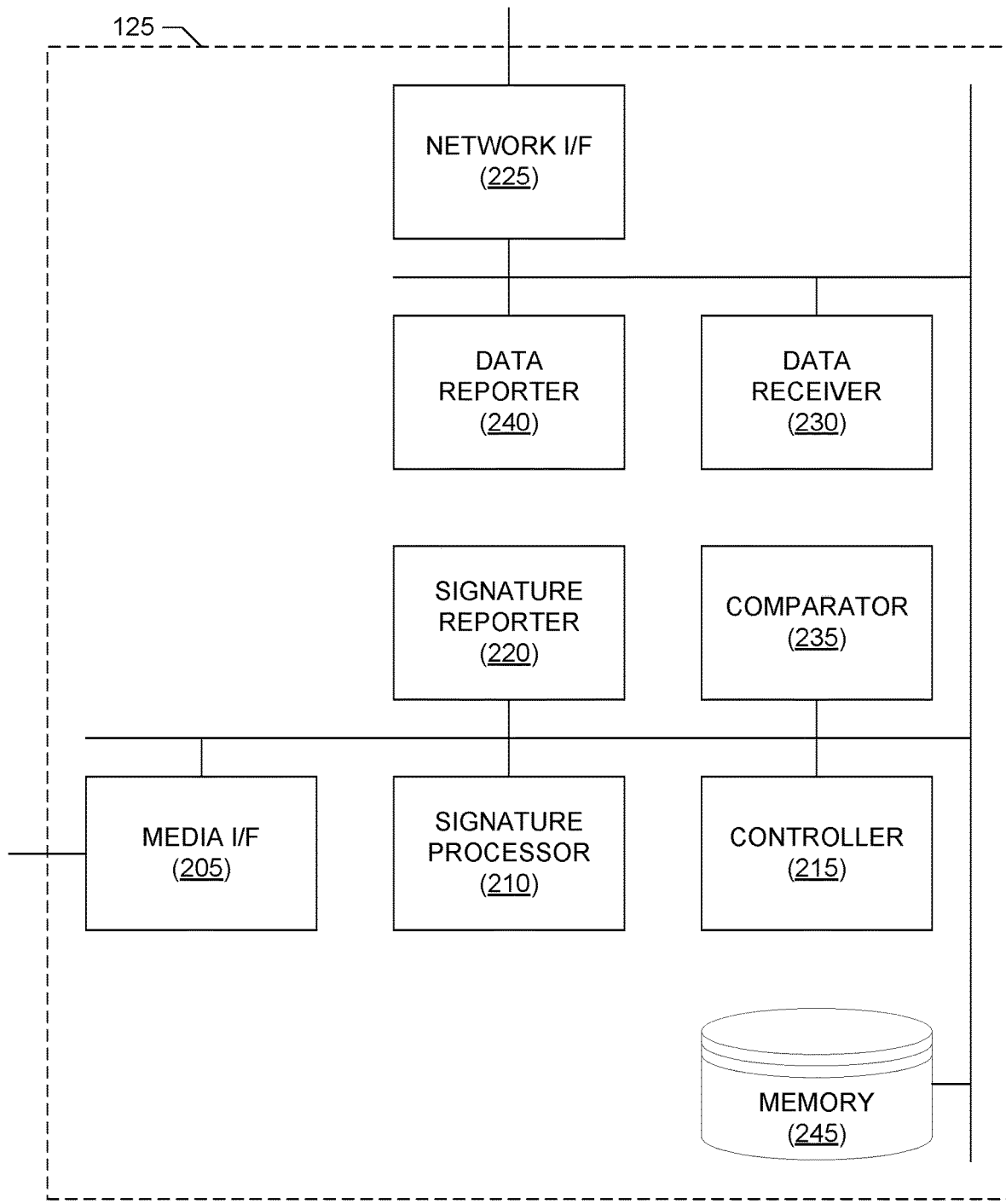
FIG. 2 is a block diagram of an example meter that can be used to implement the example audience measurement system of FIG. 1.

A block diagram of an example implementation of the device meter 125 of FIG. 1 is illustrated in FIG. 2. The example device meter 125 of FIG. 2 includes an example media interface 205 to obtain access to one or more media signals output by the media device 110. For example, the media interface 205 can be implemented by one or more cable connections to electrically, optically or otherwise communicatively couple with one or more audio outputs and/or video outputs of the media device 110. Additionally or alternatively, the media interface 205 can be implemented by one or more audio sensors, such as a microphone, a transducer, etc., capable of non-invasively receiving and processing an audio signal (e.g., such as an acoustic signal) that is output by the media device 110. Additionally or alternatively, the media interface 205 can be implemented by one or more video sensors, such as a camera, a light detector, etc., capable of non-invasively receiving and processing a video signal (e.g., such as video frames) output by the media device 110.

The example device meter 125 of FIG. 2 also includes an example signature processor 210 to generate monitored signatures from the media signal(s) obtained via the media interface 205. Each monitored signature generated by the signature processor 210 is representative of a respective segment of the media (e.g., corresponding to several seconds of the media) being presented by the media device 110. Examples of signature techniques that can be implemented by the signature processor 210 include, but are not limited to, any or all of the techniques described in U.S. Pat. No. 4,677,466 issued to Lert et al. on Jun. 30, 1987; U.S. Pat. No. 5,481,294 issued to Thomas et al. on Jan. 2, 1996; U.S. Pat. No. 7,460,684 issued to Srinivasan on Dec. 2, 2008; U.S. Publication No. 2005/0232411 to Srinivasan et al. published on Oct. 20, 2005; U.S. Publication No. 2006/0153296 to Deng published on Jul. 13, 2006; U.S. Publication No. 2006/0184961 to Lee et al. published on Aug. 17, 2006; U.S. Publication No. 2006/0195861 to Lee published on Aug. 31, 2006; U.S. Publication No. 2007/0274537 to Srinivasan published on Nov. 29, 2007; U.S. Publication No. 2008/0091288 to Srinivasan published on Apr. 17, 2008; and U.S. Publication No. 2008/0276265 to Topchy et al. published on Nov. 6, 2008, all of which are hereby incorporated by reference in their respective entireties.

The signature processor 210 of the illustrated example also generates multiple types of monitored signatures from the media signal(s) obtained via the media interface 205. For example, the signature processor 210 can generate monitored signatures of a first type and/or monitored signatures of a second type from the monitored media signal(s). The signatures of the first type can correspond to rich, high resolution signatures, whereas the signatures of the second type can correspond to light, low resolution signatures, which are smaller than the rich, high resolution signatures of the first type. An example implementation of the signature processor 210 of FIG. 2 is illustrated in FIG. 3.

Figure 3:
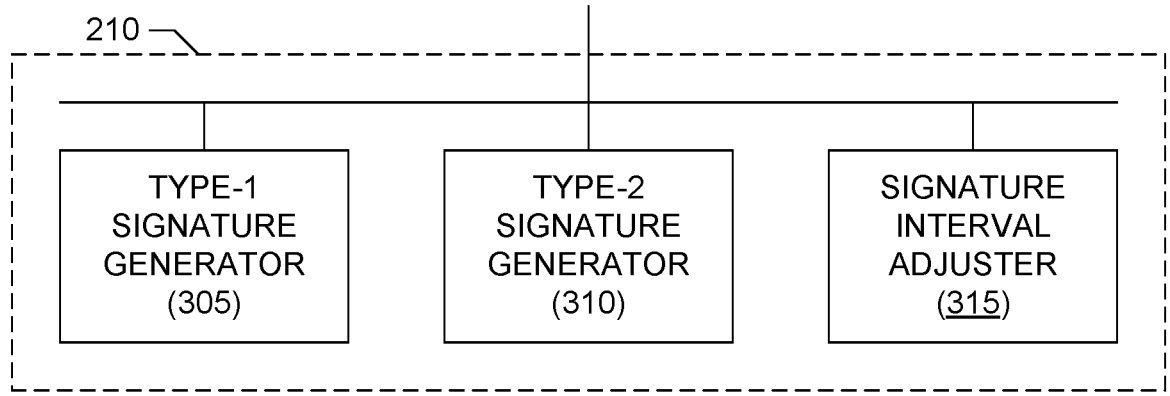
FIG. 3 is a block diagram of an example signature processor that can be used to implement the example meter of FIG. 2.

Turning to FIG. 3, the signature processor 210 of the illustrated example includes an example type-1 signature generator 305 and an example type-2 signature generator 310. The type-1 signature generator 305 generates the monitored signatures of the first type, whereas the type-2 signature generator 310 generates the monitored signatures of the second type. In some examples, the type-1 signature generator 305 and the type-2 signature generator 310 are implemented by the same physical (e.g., hardware) processor. In such examples, the monitored signatures of the first type and the monitored signatures of the second type are both generated by the signature processor 210 using the same signaturing procedure, but with the signatures of the first type being generated using a higher data sampling rate, more bits to represent the sampled media signal value, more signal frequencies from which the signatures are to be generated, etc., than are used when generating the signatures of the second type. In this way, the monitored signatures of the first type are generated to have higher resolution than the monitored signatures of the second type and, thus, the monitored signatures of the first type are typically larger (e.g., include more bits of data) than the monitored signatures of the second type.

In other examples, the type-1 signature generator 305 and the type-2 signature generator 310 are implemented by different processing elements. In such examples, the signatures of the first type and the signatures of the second type can be generated by the signature processor 210 using different signaturing procedures. For example, the type-1 signature generator 305 can implement a first signaturing procedure that yields higher resolution and, thus, larger signatures than a second signaturing procedure implemented by the type-2 signature generator 310.

The signature processor 210 of FIG. 3 also includes an example signature interval adjuster 315 to adjust the interval between monitored signatures generated by the type-1 signature generator 305 and/or the type-2 signature generator 310. In some examples, the signature interval adjuster 315 is included in the signature processor 210 to enable the intervals between generation of the monitored signatures to be adjusted based on one or more characteristics of the media signal(s) corresponding to the monitored media presentation. For example, the type-1 signature generator 305 and the type-2 signature generator 310 (or, more generally, the signature processor 210) generate monitored signatures from sequentially sampled segments of the monitored media signal(s) to enable continuous monitoring of the media presented by the media device 110. However, in some examples, such as after the monitored media has been identified using the signatures of the first type, the signature interval adjuster 315 can adjust the sampling interval between monitored signatures of the second type that are generated by the type-2 signature generator 310 based on characteristics of the monitored media signal. For example, if the signature interval adjuster 315 determines that strong audio and/or video signals have been obtained from the monitored media device 110, then the signature interval adjuster 315 can increase the interval between the monitored signatures of the second type (or, in other words, decrease the sampling rate) to improve the operating efficiency of the signature processor 210. However, if the signature interval adjuster 315 determines that weak and/or noisy audio and/or video signals have been obtained from the monitored media device 110, then the signature interval adjuster 315 can decrease the interval between the monitored signatures of the second type (or, in other words, increase the sampling rate) to improve signature matching accuracy. In some examples, to support variable intervals between signatures, the signature processor 210 associates timestamps with the monitored signatures to enable comparison of the monitored signatures with the respective reference signatures that are representative of the segments in the reference media that correspond to the segments of the monitored media that were used to generate the monitored signatures.

Returning to FIG. 2, the device meter 125 of the illustrated example also includes an example controller 215 to control operation of the signature processor 210. For example, the controller 215 causes the signature processor 210 to switch among generation of monitored signatures of different types. In some examples, the controller 215 configures the signature processor 210 to generate monitored signatures of a first type until the monitored media has been identified (e.g., which may correspond to receipt of a match success indication from the data processing facility 140). After the monitored media is identified, the controller 215 configures the signature processor 210 to generate monitored signatures of a second type to enable continuous monitoring of the media. In some examples, the controller 215 later configures the signature processor 210 to revert to generating monitored signatures of the first type when the monitored signatures of the second type are no longer able to identify the monitored media (which may correspond to receipt of a match failure indication from the data processing facility 140 or detection of a match failure by the device meter 125, which indicates that the particular reference media that was previously identified as matching the monitored media no longer correspond to the media being monitored by the device meter 125). The controller 215 can then continue cycling between configuring the signature processor 210 to generate monitored signatures of the first type vs.

monitored signatures of the second type depending upon whether the monitored media still matches a particular, previously identified reference media source.

To report the monitored signatures generated by the signature processor 210 to the data processing facility 140, the example device meter 125 of FIG. 2 includes an example signature reporter 220. The signature reporter 220 retrieves the monitored signatures generated by the signature processor 210 and formats the monitored signatures into any appropriate data format according to any appropriate protocol for sending to the data processing facility 140 via an example network interface 225. The network interface 225 is implemented using any networking technology capable of interfacing with the network 135 and capable of sending data to and receiving data from the data processing facility 140.

In the illustrated example of FIG. 2, the device meter 125 includes an example data receiver 230 to receive one or more indications from the data processing facility 140 that indicate whether monitored signatures reported by the device meter 125 have been determined to successfully match or fail to match reference signatures associated with one or more reference sources known to the audience measurement system 100. For example, the data receiver 230 may receive a match success indication from the data processing facility 140 when at least one of the monitored signatures of the first type that were previously generated and reported by the device meter 125 have been determined to match at least one reference signature corresponding to a particular reference media source from a collection of reference media known to the data processing facility 140. As such, the received match success indication can be used by the device meter 125 to infer that the media being monitored has been identified by the data processing facility 140.

In some examples, after the data processing facility 140 sends the match success indication to the device meter 125 (which is received by the data receiver 230), the data processing facility 140 also sends a sequence of reference signatures of the second type to the device meter 125, which are also received by the data receiver 230. For example, the sequence of reference signatures of the second type can correspond to the particular reference media source previously identified as matching the monitored media (e.g., via a successful match between at least one previously reported monitored signature of the first type and a corresponding reference signature of the first type that is associated with the particular reference media source). In such examples, the device meter 125 of FIG. 2 also includes an example comparator 235 to compare the received sequence of reference signatures of the second type with the monitored signatures of the second type that are generated by the signature processor 210. For example, the comparator 235 can be used to compare a monitored signature representative of a particular segment of the monitored media with a reference signature corresponding to a similar point in the identified reference media (e.g., by comparing timestamps associated with the monitored signatures and the reference signatures). The comparator 235 can implement any type(s) and/or number of comparison criteria, such as a cross-correlation value, a Hamming distance, etc., to determine whether a monitored signature and a reference signature match or substantially match within a particular tolerance level (e.g., which may be predetermined, specified as a configuration parameter or input, etc.).

In some examples, the received sequence of the reference signatures of the second type has a starting reference signature that is representative of an anchor point in the identified reference media that corresponds to the segment of the reference media represented by the reference signature of the first type that matched the previously reported monitored signature of the first type (and, thus, caused the particular reference media to be identified as corresponding to the monitored media). In some examples, device meter 125 continues to receive successive sequences of reference signatures of the second type (e.g., each sequence corresponding to some duration of the reference media, such a several minutes of the reference media) so long as the comparator 235 determines that the reference signatures of the second type continue to match the monitored signatures of the second type (and, thus, the monitored media still corresponds to the identified reference media). However, when the comparator 235 determines that a number (e.g., greater than or equal to one) of monitored signatures of the second type do not match the corresponding reference signatures of the second type (and, thus, the monitored media no longer matches the previously identified reference media), the comparator 235 causes an example data reporter 240 included in the device meter 125 to send a match failure indication, via the network interface 225, to the data processing facility 140. In some examples, the data reporter 240 may include further descriptive data associated with the match failures, such as a timestamp indicating the point in the monitored media at which the monitored signatures of the second type no longer matched the corresponding reference signatures of the second type (and, thus, the point in the monitored media at which the previously identified reference media no longer matched the monitored media).

In some examples, the device meter 125 does not include the comparator 235 and, thus, does not perform the comparison of the monitored signatures of the second type with the reference signatures of the second type. In such examples, the signature reported 220 of the device meter 125 is also used to report the monitored signatures of the second type generated by the signature processor 210 to the data processing facility 140 (e.g., via the network interface 225). In such examples, the data processing facility 140 compares the monitored signatures of the second type with the reference signatures of the second type, and sends the match failure indication to the device meter 125 (e.g., which is received by the data receiver 230 via the network interface 225), which indicates that monitored signatures of the second type no longer match the reference signatures of the second type.

The example device meter 125 of FIG. 2 also includes an example memory 245 to store the monitored signatures of the first and second types that are generated by the signature processor 210. In some examples, the memory 245 also stores the sequence(s) of reference signatures of the second type that is(are) received from the data processing facility 140. The memory 245 may be implemented by any type of a storage or memory device, a database, etc., such as the mass storage device 1130 and/or the volatile memory 1118 included in the example processing system 1100 of FIG. 11, which is described in greater detail below.

Figure 4:
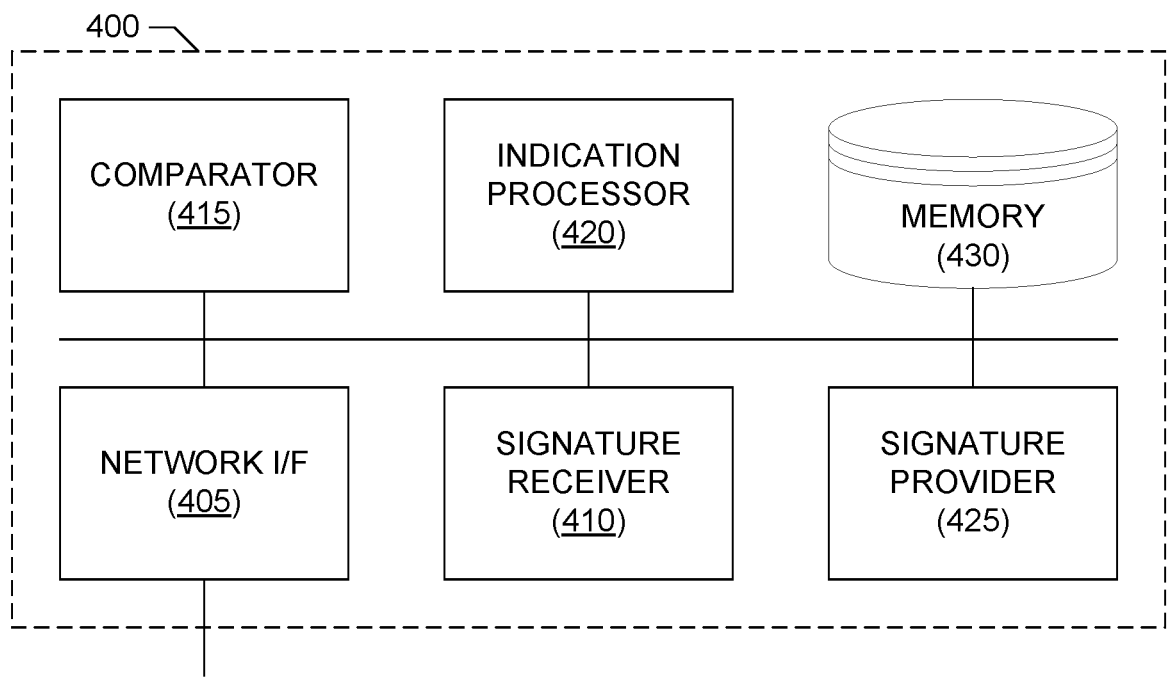
FIG. 4 is a block diagram of an example data facility processor that can be used to implement the example audience measurement system of FIG. 1.

A block diagram of an example data facility processor 400 that may be used to implement signature processing in the example data processing facility 140 of FIG. 1 is illustrated in FIG. 4. The example data facility processor 400 of FIG. 4 includes an example network interface 405 implemented using any networking technology capable of interfacing with the network 135 and capable of sending data to and receiving data from the device meter 125. The example data facility processor 400 of FIG. 4 also includes an example signature receiver 410 to receive, via the network interface 405, the monitored signatures reported by the device meter 125 in any appropriate data format according to any appropriate protocol. The example data facility processor 400 of FIG. 4 further includes an example comparator 415 to compare the monitored signatures received from the device meter 125 with reference signatures representative of the collection of reference media known to the data processing facility 140. Similar to the comparator 235 of FIG. 2, the comparator 415 of FIG. 4 can implement any type(s) and/or number of comparison criteria, such as a cross-correlation value, a Hamming distance, etc., to determine whether a monitored signature and a reference signature match or substantially match within a particular tolerance level (e.g., which may be predetermined, specified as a configuration parameter or input, etc.).

For example, the signature receiver 410 can receive the monitored signatures of the first type (e.g., the rich or high resolution monitored signatures), as described above, for comparison with reference signatures of the first type that are associated with reference media sources known to the data processing facility 140. In such examples, the comparator 415 compares the monitored signatures of the first type with the reference signatures of the first type to identify a match. When a monitored signature of the first type is determined to match a reference signature of the first type, the comparator 415 causes an example indication processor 420 included in the data facility processor 400 to send a match success indication, via the network interface 405, to the device meter 125. The comparator 415 also identifies the particular reference media represented by the matching reference signature as corresponding to the monitored media represented by the monitored signatures of the first type that have been received from the device meter 125.

In some examples, after the comparator 415 identifies the particular reference media corresponding to the monitored media, the data facility processor 400 also provides sequence(s) of reference signatures of a second type (e.g., the light or low resolution reference signatures) to the device meter 125 to enable continues monitoring of the now identified media being presented by the media device 110, as described above. In such examples, the data facility processor 400 includes an example signature provider 425 to provide the sequence(s) of reference signatures of the second type, via the network interface 405, to the device meter 125. The signature provider 425 can format the reference signatures using any appropriate data format for sending via any appropriate data protocol. In such examples, the signature provider 425 continues to provide successive sequences of reference signatures of the second type to the device meter 125 until a match failure indication is received by the indication processor 420 from the device meter 125 (e.g., which indicates that the previously identified reference media corresponding the reference signatures of the second type no longer corresponds to the media being monitored by the device meter 125).

In some examples, after the comparator 415 identifies the particular reference media corresponding to the monitored media and the indication processor sends the match success indication to the device meter, the data facility processor 400 receives the monitored signatures of the second type from the device meter, as described above. In such examples, the comparator 415 compares the monitored signatures of the second type with the sequence of reference signatures of the second type that correspond to the previously identified reference media (e.g., such as by using the processing described above in connection with the comparator 235 of FIG. 2). In such examples, the comparator 415 continues to compare the received, monitored signatures of the second type with the sequence of reference signatures of the second type until the comparator 235 determines that a number (e.g., greater than or equal to one) of monitored signatures of the second type do not match the corresponding reference signatures of the second type (and, thus, the monitored media no longer matches the previously identified reference media). When this occurs, the comparator 415 causes the indication processor 420 to send a match failure indication, via the network interface 225, to the device meter 125 (e.g., which cause the device meter 125 to switch to generating and reporting monitored signatures of the first type to enable identification of a different reference media source corresponding to the new (e.g., changed) media being monitored by the device meter 125).

The data facility processor 400 of FIG. 4 also includes an example memory 430 to store the reference signatures of the first and second types that are used for comparison with the monitored signatures of the first and second types that are generated by the device meter 125. In some examples, the memory 430 also stores the monitored signatures of the first and second types that are received from the device meter 125. The memory 430 may be implemented by any type of a storage or memory device, a database, etc., such as the mass storage device 1130 and/or the volatile memory 1118 included in the example processing system 1100 of FIG. 11, which is described in greater detail below.

While example manners of implementing the audience measurement system 100 have been illustrated in FIGS. 1-4, one or more of the elements, processes and/or devices illustrated in FIGS. 1-4 may be combined, divided, re-arranged, omitted, eliminated and/or implemented in any other way. Further, the example device meter 125, the example data processing facility 140, the example media interface 205, the example signature processor 210, the example controller 215, the example signature reporter 220, the example network interface 225, the example data receiver 230, the example comparator 235, the example data reporter 240, the example type-1 signature generator 305, the example type-2 signature generator 310, the example signature interval adjuster 315, the example data facility processor 400, the example network interface 405, the example signature receiver 410, the example comparator 415, the example indication processor 420, the example signature provider 425 and/or, more generally, the example audience measurement system 100 may be implemented by hardware, software, firmware and/or any combination of hardware, software and/or firmware. Thus, for example, any of the example device meter 125, the example data processing facility 140, the example media interface 205, the example signature processor 210, the example controller 215, the example signature reporter 220, the example network interface 225, the example data receiver 230, the example comparator 235, the example data reporter 240, the example type-1 signature generator 305, the example type-2 signature generator 310, the example signature interval adjuster 315, the example data facility processor 400, the example network interface 405, the example signature receiver 410, the example comparator 415, the example indication processor 420, the example signature provider 425 and/or, more generally, the example audience measurement system 100 could be implemented by one or more circuit(s), programmable processor(s), application specific integrated circuit(s) (ASIC(s)), programmable logic device(s) (PLD(s)) and/or field programmable logic device(s) (FPLD(s)), etc. When any of the apparatus or system claims of this patent are read to cover a purely software and/or firmware implementation, at least one of the example audience measurement system 100, the example device meter 125, the example data processing facility 140, the example media interface 205, the example signature processor 210, the example controller 215, the example signature reporter 220, the example network interface 225, the example data receiver 230, the example comparator 235, the example data reporter 240, the example type-1 signature generator 305, the example type-2 signature generator 310, the example signature interval adjuster 315, the example data facility processor 400, the example network interface 405, the example signature receiver 410, the example comparator 415, the example indication processor 420 and/or the example signature provider 425 are hereby expressly defined to include a tangible computer readable medium such as a memory, digital versatile disk (DVD), compact disk (CD), Blu-ray Disc™, etc., storing such software and/or firmware. Further still, the example audience measurement system 100 of FIGS. 1-4 may include one or more elements, processes and/or devices in addition to, or instead of, those illustrated in FIGS. 1-4, and/or may include more than one of any or all of the illustrated elements, processes and devices.

Flowcharts representative of example machine readable instructions for implementing the example audience measurement system 100, the example device meter 125, the example data processing facility 140, the example media interface 205, the example signature processor 210, the example controller 215, the example signature reporter 220, the example network interface 225, the example data receiver 230, the example comparator 235, the example data reporter 240, the example type-1 signature generator 305, the example type-2 signature generator 310, the example signature interval adjuster 315, the example data facility processor 400, the example network interface 405, the example signature receiver 410, the example comparator 415, the example indication processor 420 and/or the example signature provider 425 are shown in FIGS. 5-10. In these examples, the machine readable instructions represented by each flowchart may comprise one or more programs for execution by a processor, such as the processor 1112 shown in the example processing system 1100 discussed below in connection with FIG. 11. The one or more programs, or portion(s) thereof, may be embodied in software stored on a tangible computer readable medium such as a CD-ROM, a floppy disk, a hard drive, a digital versatile disk (DVD), a Blu-ray Disc™, or a memory associated with the processor 1112, but the entire program or programs and/or portions thereof could alternatively be executed by a device other than the processor 1112 (e.g., such as a controller and/or any other suitable device) and/or embodied in firmware or dedicated hardware (e.g., implemented by an ASIC, a PLD, an FPLD, discrete logic, etc.). Also, one or more of the machine readable instructions represented by the flowchart of FIGS. 5-10 may be implemented manually. Further, although the example machine readable instructions are described with reference to the flowcharts illustrated in FIGS. 5-10, many other methods of implementing the example audience measurement system 100, the example device meter 125, the example data processing facility 140, the example media interface 205, the example signature processor 210, the example controller 215, the example signature reporter 220, the example network interface 225, the example data receiver 230, the example comparator 235, the example data reporter 240, the example type-1 signature generator 305, the example type-2 signature generator 310, the example signature interval adjuster 315, the example data facility processor 400, the example network interface 405, the example signature receiver 410, the example comparator 415, the example indication processor 420 and/or the example signature provider 425 may alternatively be used. For example, with reference to the flowcharts illustrated in FIGS. 5-10, the order of execution of the blocks may be changed, and/or some of the blocks described may be changed, eliminated, combined and/or subdivided into multiple blocks.

As mentioned above, the example processes of FIGS. 5-10 may be implemented using coded instructions (e.g., computer readable instructions) stored on a tangible computer readable medium such as a hard disk drive, a flash memory, a read-only memory (ROM), a CD, a DVD, a cache, a random-access memory (RAM) and/or any other storage media in which information is stored for any duration (e.g., for extended time periods, permanently, brief instances, for temporarily buffering, and/or for caching of the information). As used herein, the term tangible computer readable medium is expressly defined to include any type of computer readable storage and to exclude propagating signals. Additionally or alternatively, the example processes of FIGS. 5-10 may be implemented using coded instructions (e.g., computer readable instructions) stored on a non-transitory computer readable medium, such as a flash memory, a ROM, a CD, a DVD, a cache, a random-access memory (RAM) and/or any other storage media in which information is stored for any duration (e.g., for extended time periods, permanently, brief instances, for temporarily buffering, and/or for caching of the information). As used herein, the term non-transitory computer readable medium is expressly defined to include any type of computer readable medium and to exclude propagating signals. Also, as used herein, the terms "computer readable" and "machine readable" are considered equivalent unless indicated otherwise. Furthermore, as used herein, when the phrase "at least" is used as the transition term in a preamble of a claim, it is open-ended in the same manner as the term "comprising" is open ended. Thus, a claim using "at least" as the transition term in its preamble may include elements in addition to those expressly recited in the claim.

Figure 5:
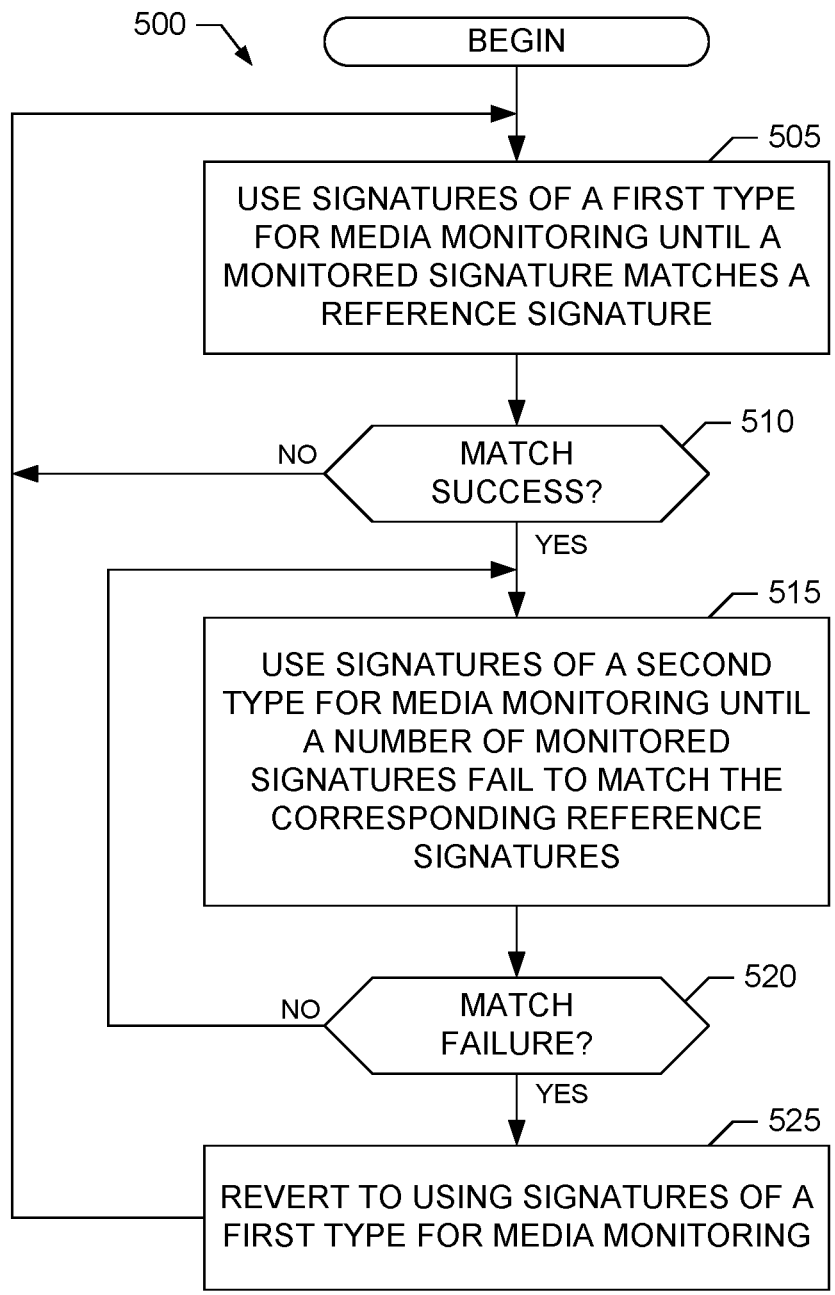
FIG. 5 is a flowchart representative of example machine readable instructions that may be executed to implement the example audience measurement system of FIG. 1.

Example machine readable instructions 500 that may be executed to implement the example audience measurement system 100 of FIG. 1 are represented by the flowchart shown in FIG. 5. With reference to the preceding figures, the machine readable instructions 500 of FIG. 5 begin execution at block 505 at which the device meter 125 and the data processing facility 140 of the audience measurement system 100 use monitored and reference signatures of a first type (e.g., corresponding to rich, high-resolution signatures) for monitoring media being presented by the media device 110 until at least one monitored signature is determined to match a reference signature, as described above. At block 510, the device meter 125 and the data processing facility 140 determine whether a successful match has occurred and, thus, the monitored media can be identified as corresponding to the particular reference media, from the collection of reference media, that is represented by the matching reference signature of the first type.

If a successful match has occurred (block 510), then at block 515 the device meter 125 and the data processing facility 140 use monitored and reference signatures of a second type (e.g., corresponding to light, low-resolution signatures) for monitoring the media being presented by the media device 110 until at a number of monitored signatures fail to match their corresponding reference signatures. As described above, the reference signatures of the second type represent the particular reference media that was previously identified as corresponding to the monitored media. At block 520, the device meter 125 and the data processing facility 140 determine whether the number of monitored signatures fail have failed to match their corresponding reference signatures and, thus, the media being presented by the media device 110 no longer corresponds to the previously identified reference media. As described above, the number of monitored signatures used to determine whether a match failure has occurred is greater than or equal to one, and may be hard-coded, preconfigured, specified, etc.

If a match failure has occurred (block 520), then at block 525 the device meter 125 and the data processing facility 140 revert to using the monitored and reference signatures of the first type (e.g., corresponding to rich, high-resolution signatures) for monitoring the media being presented by the media device 110 (e.g., to enable the new/changed media to be initially identified). Accordingly, processing returns to block 505 and blocks subsequent thereto to enable signature processing to revert to using the monitored and reference signatures of the first type.

Figure 6:
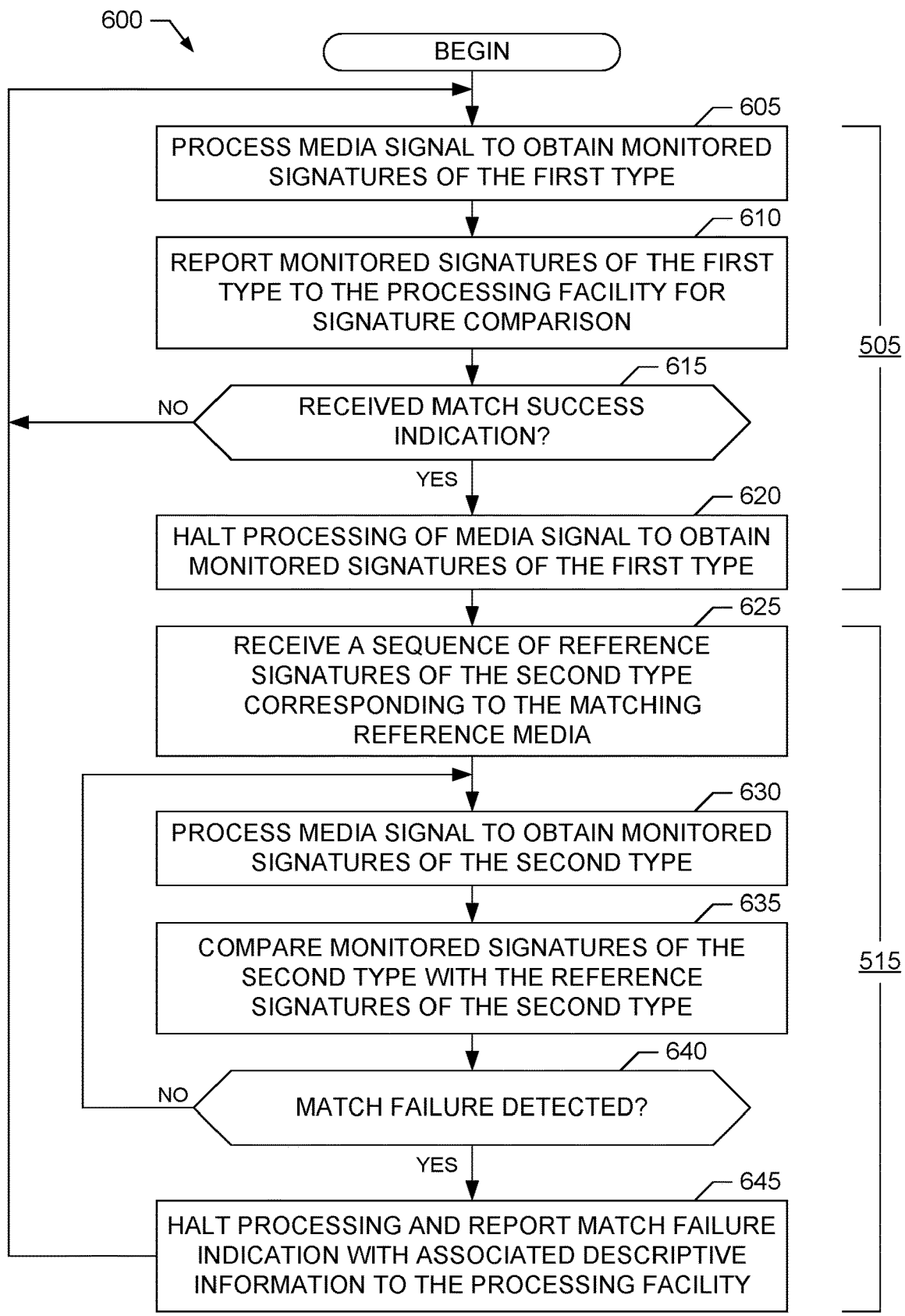
FIG. 6 is a flowchart representative of first example machine readable instructions that may be executed to implement the example meter of FIG. 2 and/or that may be used to perform meter processing in the example machine readable instructions of FIG. 5.

First example machine readable instructions 600 that may be executed to implement the example device meter 125 of FIGS. 1-3 are represented by the flowchart shown in FIG. 6. With reference to the preceding figures, the machine readable instructions 600 of FIG. 6 begin execution at block 605 at which the signature processor 210 of the device meter 125 processes the media signal(s) forming the media being presented by the media device 110 to obtain (e.g., generate) monitored signatures of a first type (e.g., the rich, high resolution signatures). At block 610, the signature reporter 220 of the device meter 125 reports the monitored signatures of the first type to the data processing facility 140 for comparison with reference signatures of the first type that represent a collection of reference media sources known to the audience measurement system 100. At block 615, the data receiver 230 of the device meter 125 monitors for receipt of a match success indication, which indicates that at least one monitored signature of the first type has matched a reference signature of the first type. If a match success indication is received (block 615), then at block 620 the controller 215 of the device meter 125 causes the signature processor 210 to halt the processing to obtain monitored signatures of the first type (e.g., because the monitored media has been identified as corresponding to the particular reference media represented by the matching reference signature). As illustrated in FIG. 6, the processing at blocks 605 through 620 corresponds to the processing at block 505 of FIG. 5.

At block 625 of FIG. 6, the data receiver 230 receives a sequence of reference signatures of a second type (e.g., the light, low resolution signatures) that correspond (e.g., represent) the matching reference media previously identified using the signatures of the first type. At block 630, the signature processor 210 processes the media signal(s) forming the media being presented by the media device 110 to obtain (e.g., generate) monitored signatures of the second type. At block 635, the comparator 235 of the device meter 125 compares the monitored signatures of the second type with the sequence of reference signatures of the second type until a match failure is detected. At block 640, the comparator 235 determines whether the match failure has been detected. As described above, a match failure can correspond to a number of monitored signatures of the second type failing to match their corresponding reference signatures of the second type. If the match failure is detected (block 640), then at block 645 the controller 215 causes the signature processor 210 to halt the processing to obtain monitored signatures of the second type (e.g., because the monitored media has been determined to no longer correspond to the previously matching reference media). At block 645, the data reporter 240 of the device meter 125 also reports a match failure indication and any associated information to the data processing facility 140, which indicates that the monitored media has been determined to no longer correspond to the previously matching reference media. Processing then returns to blocks 605 and blocks subsequent thereto to enable signature processing to revert to using the signatures of the first type to initially identify the new/changed media being presented by the media device 110. As illustrated in FIG. 6, the processing at blocks 625 through 645 corresponds to the processing at block 515 of FIG. 5.

Figure 7:
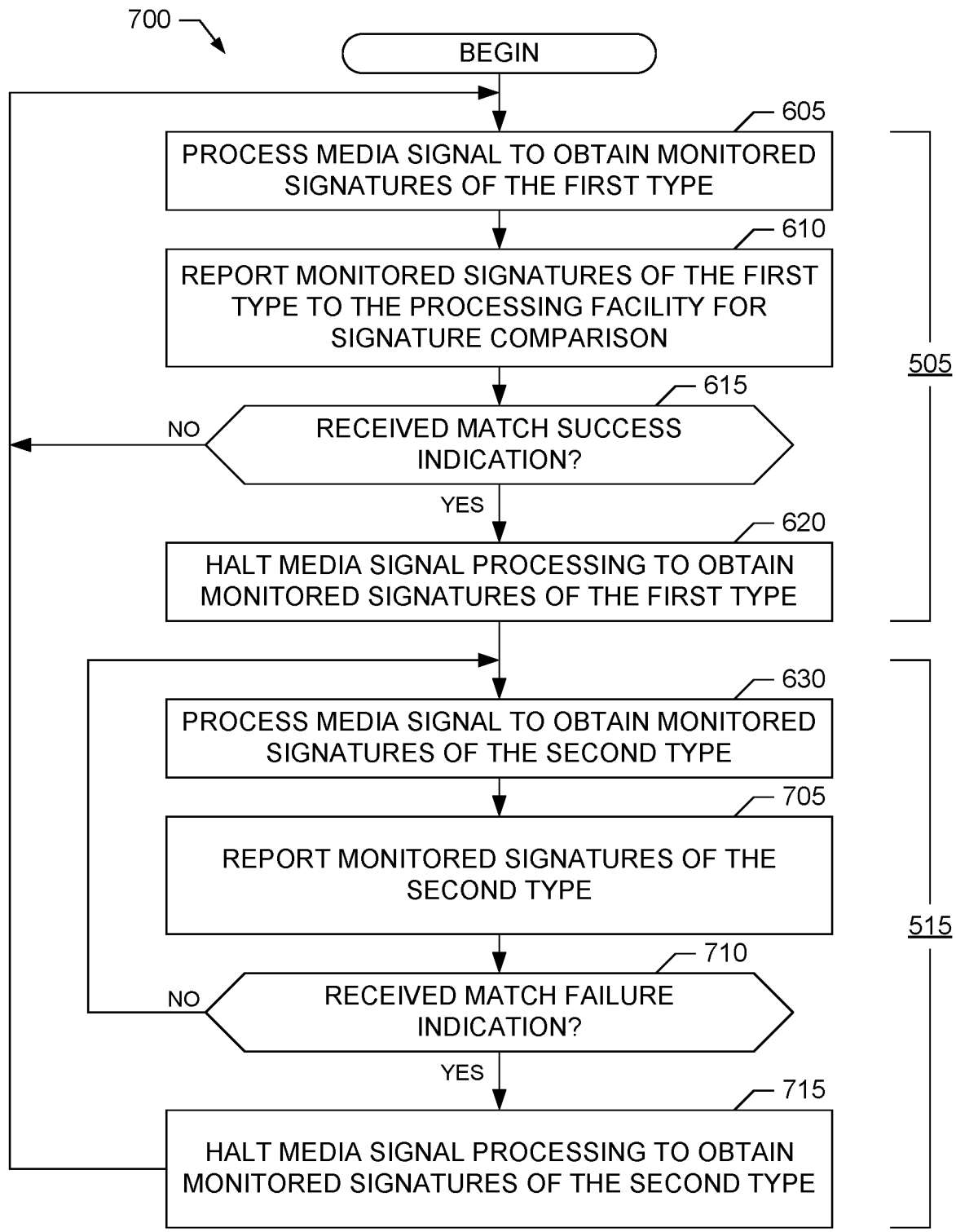
FIG. 7 is a flowchart representative of second example machine readable instructions that may be executed to implement the example meter of FIG. 2 and/or that may be used to perform meter processing in the example machine readable instructions of FIG. 5.

Second example machine readable instructions 700 that may be executed to implement the example device meter 125 of FIGS. 1-3 are represented by the flowchart shown in FIG. 7. FIG. 7 includes blocks 605-620 and 630 from FIG. 6. Accordingly, the processing performed by the example machine readable instructions 700 at these blocks is described in detail above in connection with the discussion of FIG. 6 and, in the interest of brevity, is not repeated in the discussion of FIG. 7.

With reference to the preceding figures, the machine readable instructions 700 of FIG. 7 begin execution at block 605 and perform the processing at blocks 605 through 620 and 630 as described above in connection with the description of the machine readable instructions 600 of FIG. 6. Thus, at this point in the machine readable instructions 700, the signature processor 210 of the device meter 125 is obtaining (e.g., generating) monitored signatures of the second type for comparison with reference signatures of the second type that correspond to (e.g., represent) the particular reference media previously identified as matching the media being monitored by the device meter 125. At block 705, the signature reporter 220 of the device meter 125 reports the monitored signatures of the second type to the data processing facility 140 for comparison with the sequence of reference signatures of the second type that represent the previously identified, matching reference media source. At block 710, the data receiver 230 of the device meter 125 monitors for receipt of a match failure indication, which indicates that a number of monitored signatures of the second type have failed to match their corresponding reference signatures of the second type. If the match failure indication is received (block 615), then at block 620 the controller 215 of the device meter 125 causes the signature processor 210 to halt the processing to obtain monitored signatures of the second type (e.g., because the monitored media has been determined to no longer correspond to the previously matching reference media). Processing then returns to blocks 605 and blocks subsequent thereto to enable signature processing to revert to using the signatures of the first type to initially identify the new/changed media being presented by the media device 110. As illustrated in FIG. 7, the processing at blocks 630 and 705 through 715 corresponds to the processing at block 515 of FIG. 5.

Figure 8:
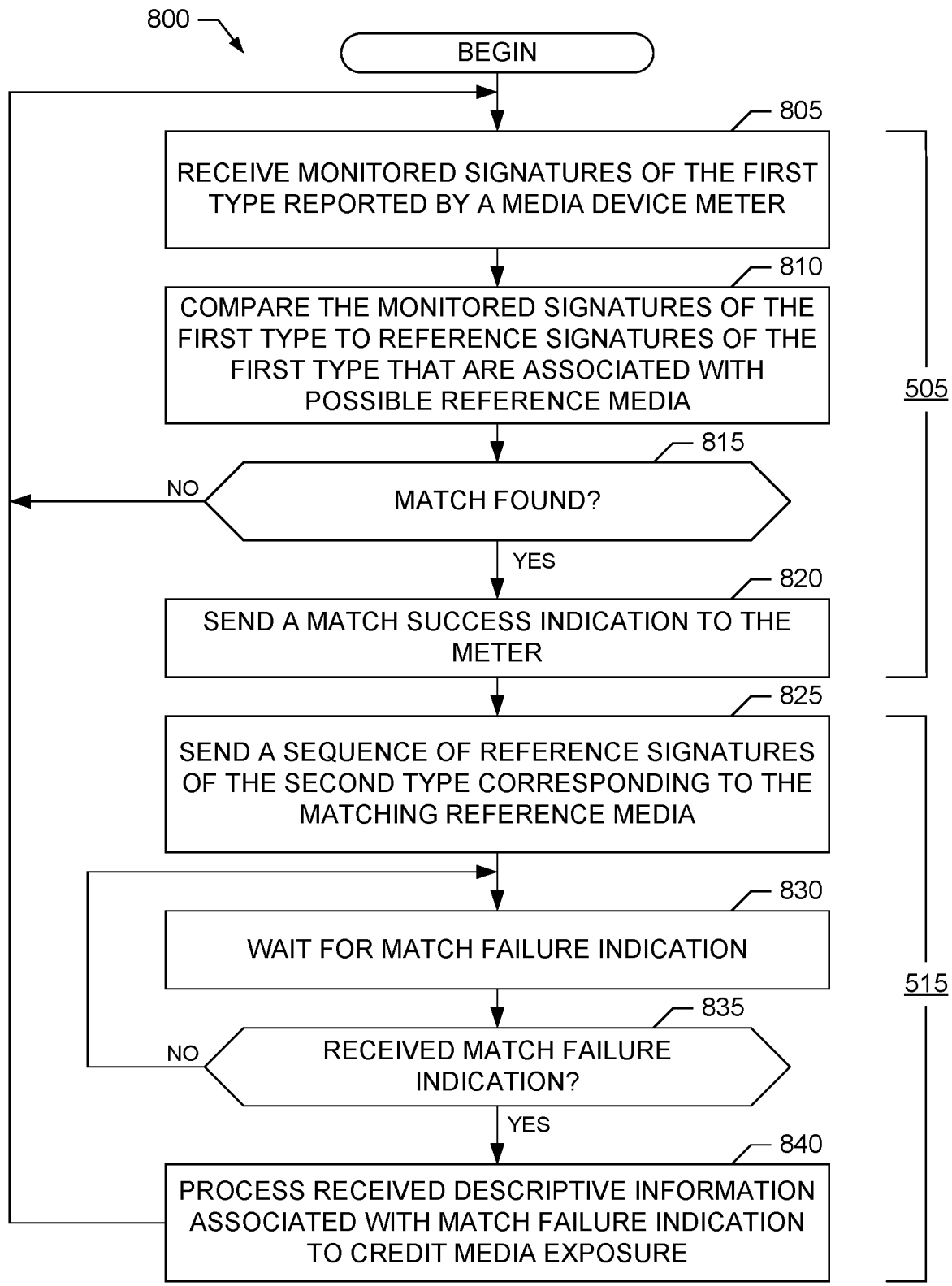
FIG. 8 is a flowchart representative of first example machine readable instructions that may be executed to implement the example data facility processor of FIG. 4 and/or that may be used to perform data facility processing in the example machine readable instructions of FIG. 5.

First example machine readable instructions 800 that may be executed to implement the example data facility processor 400 of the example data processing facility 140 of FIGS. 1 and 4 are represented by the flowchart shown in FIG. 8. With reference to the preceding figures, the machine readable instructions 800 of FIG. 8 begin execution at block 805 at which the signature receiver 410 of the data facility processor 400 receives monitored signatures of a first type (e.g., the rich, high resolution signatures) from the device meter 125, which are representative of the media being presented by the media device 110. At block 810, the comparator 415 of the data facility processor 400 compares the received, monitored signatures of the first type with reference signatures of the first type that are representative of a collection of reference media sources known to the data processing facility 140. At block 815, the comparator 415 determines whether a match between the monitored signatures of the first type and the reference signatures of the first type has been found. If a match has been found and, thus, the matching reference media can be used to identify the media being monitored by the device meter 125 (block 815), then at block 820 the indication processor 420 of the data facility processor 400 sends a match success indication to the device meter 125 (e.g., which causes the device meter 125 to switch to generating and reporting monitored signatures of a different type). As illustrated in FIG. 8, the processing at blocks 805 through 820 corresponds to the processing at block 505 of FIG. 5.

At block 825, the signature provider 425 of the data facility processor 400 sends sequence(s) of reference signatures of a second type (e.g., the light, low resolution signatures) to the device meter 125 for comparison with monitored signatures of the first type. As described above, the sequence(s) of reference signatures of the second type are representative of the matching reference media previously identified as corresponding to the media being monitored by the device meter 125. At block 830, the indication processor 420 monitors for receipt of a match failure indication, which indicates that the reference signatures of the second type no longer match the monitored signatures of the second type being generated by the device meter 125 and, thus, the monitored media no longer corresponds to previously identified, matching reference media. If the match failure indication is received (block 835), then at block 840 the indication processor 420 also receives and processes descriptive information for the match failure, such as a timestamp indicating when the failure was detected, to enable proper crediting of the monitored media (e.g., such as by determining the duration of time over which the monitored media corresponded to the previously matching reference media). Processing then returns to blocks 805 and blocks subsequent thereto to enable signature processing to revert to using the signatures of the first type to initially identify the new/changed media being presented by the media device 110. As illustrated in FIG. 8, the processing at blocks 825 through 840 corresponds to the processing at block 515 of FIG. 5.

Figure 9:
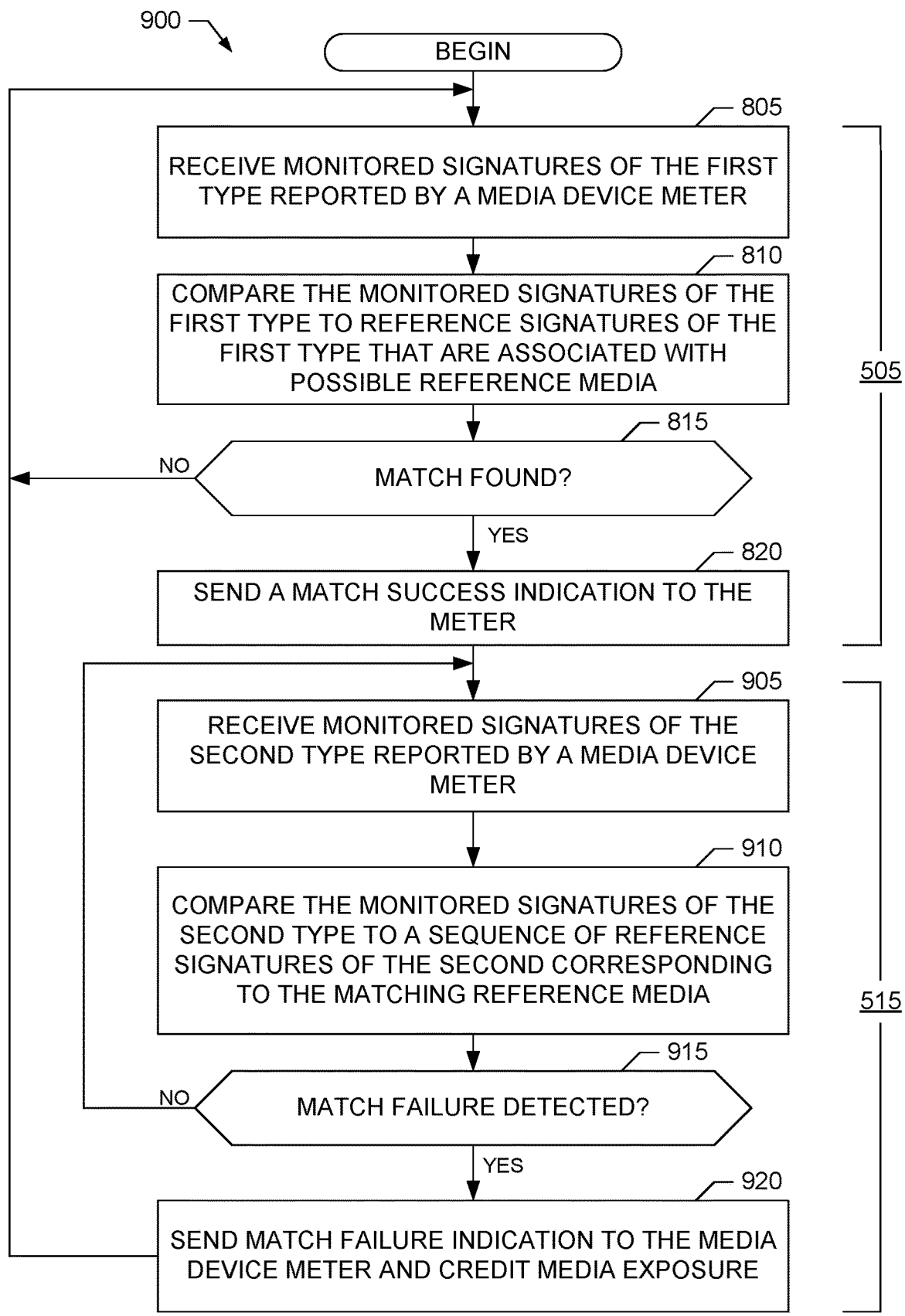
FIG. 9 is a flowchart representative of second example machine readable instructions that may be executed to implement the example data facility processor of FIG. 4 and/or that may be used to perform data facility processing in the example machine readable instructions of FIG. 5.

Second example machine readable instructions 900 that may be executed to implement the example data facility processor 400 of the example data processing facility 140 of FIGS. 1 and 4 are represented by the flowchart shown in FIG. 9. FIG. 9 includes blocks 805 through 820 from FIG. 8. Accordingly, the processing performed by the example machine readable instructions 900 at these blocks is described in detail above in connection with the discussion of FIG. 8 and, in the interest of brevity, is not repeated in the discussion of FIG. 9.

With reference to the preceding figures, the machine readable instructions 900 of FIG. 9 begin execution at block 805 and perform the processing at blocks 805 through 820 as described above in connection with the description of the machine readable instructions 800 of FIG. 8. Thus, at this point in the machine readable instructions 900, the data facility processor 400 has used the signatures of the first type to identify matching reference media that corresponds to the media being presented at the monitored site 105 by the media device 110 and that is being monitored by the device meter 125. Next, at block 905, the signature receiver 410 of the data facility processor 400 receives monitored signatures of the second type from the device meter 125, which are representative of the media being presented by the media device 110. At block 910, the comparator 415 of the data facility processor 400 compares the monitored signatures of the second type with a sequence of reference signatures of the second type that are representative of the matching reference media previously identified as corresponding to the media being monitored by the device meter 125.

At block 915, the comparator 415 determines whether a match failure has been detected. As described above, the match failure can correspond to a number of monitored signatures of the second type failing to match their corresponding reference signatures of the second type. If the match failure is detected (block 915), then at block 920 the indication processor 420 of the data facility processor 400 sends a match failure indication to the device meter 125, which indicates that the monitored media has been determined to no longer correspond to the previously matching reference media. Processing then returns to blocks 805 and blocks subsequent thereto to enable signature processing to revert to using the signatures of the first type to initially identify the new/changed media being presented by the media device 110. As illustrated in FIG. 9, the processing at blocks 905 through 920 corresponds to the processing at block 515 of FIG. 5.

Figure 10:
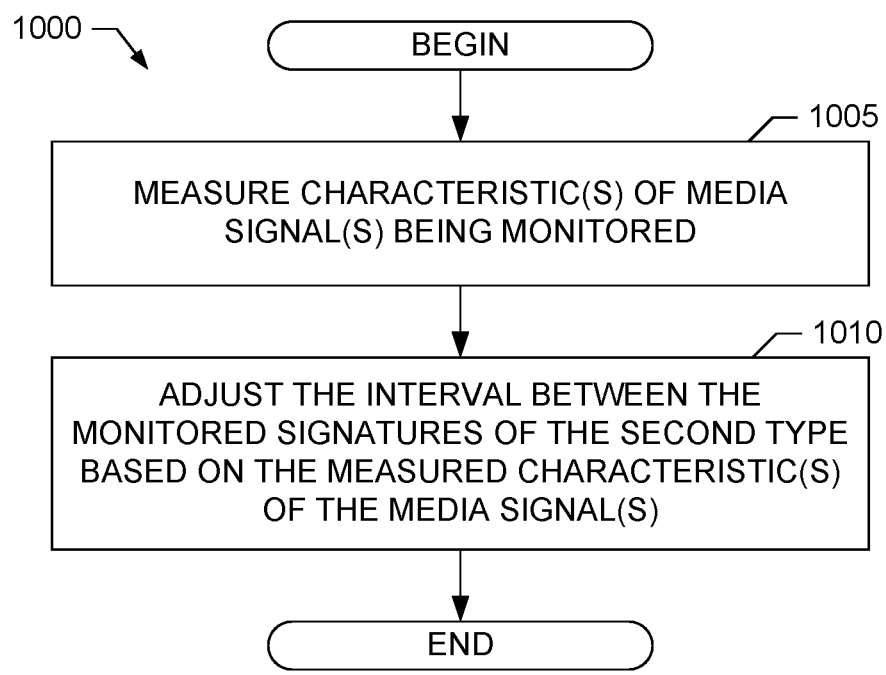
FIG. 10 is a flowchart representative of example machine readable instructions that may be executed to implement signature interval adjustment in the example meter of FIG. 2 and/or the example signature processor of FIG. 3.

Example machine readable instructions 1000 that may be executed to implement the example signature interval adjuster 315 of the example signature processor 210 of FIGS. 2 and/or 3 are represented by the flowchart shown in FIG. 10. With reference to the preceding figures, the machine readable instructions 1000 of FIG. 10 begin execution at block 1005 at which the signature interval adjuster 315 measures characteristic(s) of the media signal(s) being output by the media device 110 and that are being monitored by the device meter 125. For example, the signature interval adjuster 315 can measure signal strength (e.g., such as in terms of signal power, signal energy, signal volume, signal amplitude, etc.), signal-to-noise ratio, noise content, etc. At block 1010, the signature interval adjuster 315 adjusts the sampling interval between monitored signatures of the second type (e.g., the light, low resolution signatures) that are generated by the signature processor 210 (e.g., by the type 2 signature generator 310 of the signature processor 210). For example, the signature interval adjuster 315 can increase the interval between the monitored signatures of the second type (or, in other words, decrease the sampling rate) when the measured characteristic(s) indicate that the monitored media signal(s) is(are) strong and/or are not noisy, but can decrease the interval between the monitored signatures of the second type (or, in other words, increase the sampling rate) when the measured characteristic(s) indicate that the monitored media signal(s) is(are) weak and/or are noisy. Processing returns to block 1005 and blocks subsequent thereto to enable the signature interval adjuster 315 to continue to adjust the sampling intervals between the monitored signatures based on the measured characteristic(s) of the monitored media signal(s).

Figure 11:
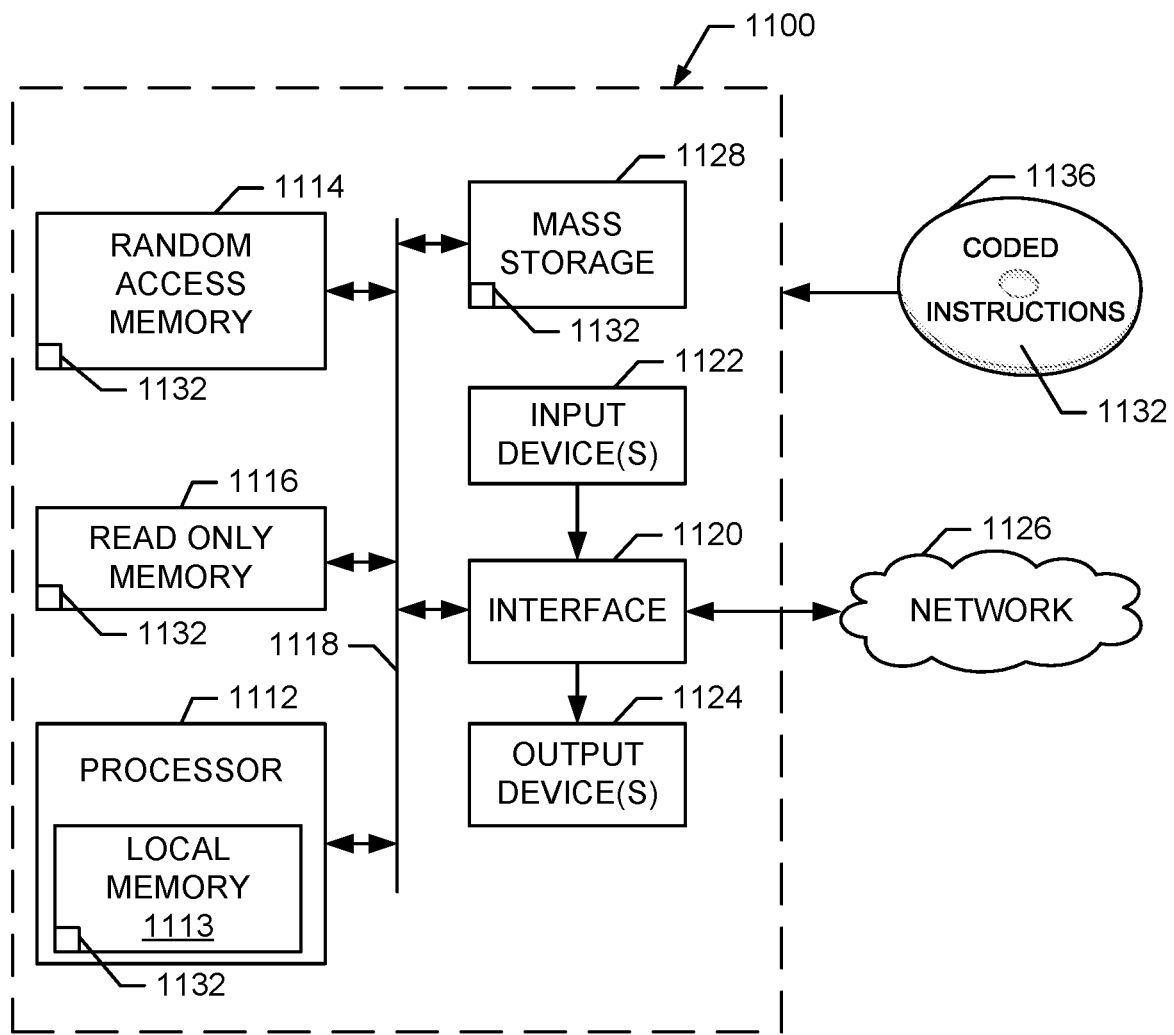
FIG. 11 is a block diagram of an example processing system that may execute the example machine readable instructions of FIGS. 5-9 and/or 10 to implement the example meter of FIG. 2, the example signature processor of FIG. 3, the example data facility processor of FIG. 4 and/or the example audience measurement system of FIG. 1.

FIG. 11 is a block diagram of an example processing system 1100 capable of executing the instructions of FIGS. 5-10 to implement the example audience measurement system 100, the example device meter 125, the example data processing facility 140, the example media interface 205, the example signature processor 210, the example controller 215, the example signature reporter 220, the example network interface 225, the example data receiver 230, the example comparator 235, the example data reporter 240, the example type-1 signature generator 305, the example type-2 signature generator 310, the example signature interval adjuster 315, the example data facility processor 400, the example network interface 405, the example signature receiver 410, the example comparator 415, the example indication processor 420 and/or the example signature provider 425 of FIGS. 1-4. The processing system 1100 can be, for example, a server, a personal computer, a mobile phone (e.g., a smartphone, a cell phone, etc.), a personal digital assistant (PDA), an Internet appliance, a DVD player, a CD player, a digital video recorder, a Blu-ray player, a gaming console, a personal video recorder, a set top box, a digital camera, or any other type of computing device.

The system 1100 of the instant example includes a processor 1112. For example, the processor 1112 can be implemented by one or more microprocessors and/or controllers from any desired family or manufacturer.

The processor 1112 includes a local memory 1113 (e.g., a cache) and is in communication with a main memory including a volatile memory 1114 and a non-volatile memory 1116 via a bus 1118. The volatile memory 1114 may be implemented by Static Random Access Memory (SRAM), Synchronous Dynamic Random Access Memory (SDRAM), Dynamic Random Access Memory (DRAM), RAMBUS Dynamic Random Access Memory (RDRAM) and/or any other type of random access memory device. The non-volatile memory 1116 may be implemented by flash memory and/or any other desired type of memory device. Access to the main memory 1114, 1116 is controlled by a memory controller.

The processing system 1100 also includes an interface circuit 1120. The interface circuit 1120 may be implemented by any type of interface standard, such as an Ethernet interface, a universal serial bus (USB), and/or a PCI express interface.

One or more input devices 1122 are connected to the interface circuit 1120. The input device(s) 1122 permit a user to enter data and commands into the processor 1112. The input device(s) can be implemented by, for example, a keyboard, a mouse, a touchscreen, a track-pad, a trackball, a trackbar (such as an isopoint), a voice recognition system and/or any other human-machine interface.

One or more output devices 1124 are also connected to the interface circuit 1120. The output devices 1124 can be implemented, for example, by display devices (e.g., a liquid crystal display, a cathode ray tube display (CRT)), a printer and/or speakers. The interface circuit 1120, thus, typically includes a graphics driver card.

The interface circuit 1120 also includes a communication device, such as a modem or network interface card, to facilitate exchange of data with external computers via a network 1126 (e.g., an Ethernet connection, a digital subscriber line (DSL), a telephone line, coaxial cable, a cellular telephone system, etc.).

The processing system 1100 also includes one or more mass storage devices 1128 for storing machine readable instructions and data. Examples of such mass storage devices 1128 include floppy disk drives, hard drive disks, compact disk drives and digital versatile disk (DVD) drives. In some examples, the mass storage device 1130 may implement the memory 245 and/or the memory 430. Additionally or alternatively, in some examples the volatile memory 1118 may implement the memory 245 and/or the memory 430.

Coded instructions 1132 corresponding to the instructions of FIGS. 5-10 may be stored in the mass storage device 1128, in the volatile memory 1114, in the non-volatile memory 1116, in the local memory 1113 and/or on a removable storage medium, such as a CD or DVD 1136.

As an alternative to implementing the methods and/or apparatus described herein in a system such as the processing system of FIG. 11, the methods and or apparatus described herein may be embedded in a structure such as a processor and/or an ASIC (application specific integrated circuit).

Finally, although certain example methods, apparatus and articles of manufacture have been described herein, the scope of coverage of this patent is not limited thereto. On the contrary, this patent covers all methods, apparatus and articles of manufacture fairly falling within the scope of the appended claims either literally or under the doctrine of equivalents.

What is claimed is:

1. A local device comprising:
memory including a set of reference fingerprints corresponding to media presented at a location, the set of reference fingerprints from a remote device different from the local device; and
at least one processor to execute machine readable instructions to:
generate a monitored fingerprint of the media presented at the location;
compare the monitored fingerprint to at least some of the set of reference fingerprints from the remote device;
determine an amount of time that has passed since the media started; and
after a match between the monitored fingerprint and one or more reference fingerprints of the set of reference fingerprints, cause transmission of audience measurement information to identify the media, the audience measurement information including data indicative of the amount of time that has passed since the media started.

2. The local device of claim 1, wherein the media is presented by a television.

3. The local device of claim 2, wherein the local device is integrated with the television.

4. The local device of claim 1, wherein the remote device is a server of an audience measurement system.

5. The local device of claim 1, wherein the amount of time that has passed since the media started is based on a time of the match between the monitored fingerprint and the one or more reference fingerprints of the set of reference fingerprints.

6. At least one non-transitory computer readable medium comprising computer readable instructions that, when executed by at least one processor of a local device, cause the local device to at least:
generate a monitored fingerprint of media presented at a location;
compare the monitored fingerprint to at least some of a set of reference fingerprints, the set of reference fingerprints corresponding to the media presented at the location, the set of reference fingerprints from a remote device different from the local device;
determine an amount of time that has passed since the media started; and
after a match between the monitored fingerprint and one or more reference fingerprints of the set of reference fingerprints, cause transmission of audience measurement information to identify the media, the audience measurement information including data indicative of the amount of time that has passed since the media started.

7. The at least one non-transitory computer readable medium of claim 6, wherein the media is presented by a television.

8. The at least one non-transitory computer readable medium of claim 7, wherein the local device is integrated with the television.

9. The at least one non-transitory computer readable medium of claim 6, wherein the remote device is a server of an audience measurement system.

10. The at least one non-transitory computer readable medium of claim 6, wherein the amount of time that has passed since the media started is based on a time of the match between the monitored fingerprint and the one or more reference fingerprints of the set of reference fingerprints.

11. A computing device comprising:
a network interface for: (i) receiving a set of reference fingerprints from a remote device, the set of reference fingerprints corresponding to media presented at a location, and (ii) transmitting audience measurement information to identify the media presented at the location;
memory to store the set of reference fingerprints;
a signature processor to generate a monitored fingerprint of the media presented at the location; and
a signature comparator to: (i) compare the monitored fingerprint to at least some of the set of reference fingerprints, (ii) identify a match between the monitored fingerprint and one or more reference fingerprints of the set of reference fingerprints, the match identifying the media presented at the location, and (iii) determine an anchor point in the identified media based on the one or more reference fingerprints, the anchor point indicative of an amount of time that has passed since the media started;
wherein the audience measurement information to identify the media is transmitted responsive to the match identifying the media, the audience measurement information including data indicative of the amount of time that has passed since the media started.

12. The computing device of claim 11, wherein the media is presented by a television.

13. The computing device of claim 12, wherein the computing device is integrated with the television.

14. The computing device of claim 11, wherein the remote device is a server of an audience measurement system.

15. The computing device of claim 11, wherein the amount of time that has passed since the media started is based on a time of the match between the monitored fingerprint and the one or more reference fingerprints of the set of reference fingerprints.

16. A method comprising:
generating, by executing an instruction with at least one processor of a local device, a monitored fingerprint of media presented at a location;
comparing, by executing an instruction with the at least one processor, the monitored fingerprint to at least some of a set of reference fingerprints, the set of reference fingerprints corresponding to the media presented at the location, the set of reference fingerprints from a remote device different from the local device;
determining, by executing an instruction with the at least one processor, an amount of time that has passed since the media started; and
after a match between the monitored fingerprint and one or more reference fingerprints of the set of reference fingerprints, transmitting audience measurement information to identify the media, the audience measurement information including data indicative of the amount of time that has passed since the media started.

17. The method of claim 16, wherein the media is presented by a television.

18. The method of claim 17, wherein the local device is integrated with the television.

19. The method of claim 16, wherein the remote device is a server of an audience measurement system.

20. The method of claim 16, wherein the amount of time that has passed since the media started is based on a time of the match between the monitored fingerprint and the one or more reference fingerprints of the set of reference fingerprints.

* * * * *